United States Patent
Buchmann et al.

(10) Patent No.: US 12,411,853 B2
(45) Date of Patent: Sep. 9, 2025

(54) CENTRALIZED METADATA REPOSITORY WITH RELEVANCY IDENTIFIERS

(71) Applicant: SAP SE, Walldorf (DE)

(72) Inventors: Daniel Buchmann, Karlsruhe (DE); Timm Falter, Sinsheim-Hilsbach (DE); Ralf Dentzer, Hockenheim (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 17/482,250

(22) Filed: Sep. 22, 2021

(65) Prior Publication Data

US 2023/0091845 A1 Mar. 23, 2023

(51) Int. Cl.
*G06F 16/2457* (2019.01)
*G06F 16/28* (2019.01)

(52) U.S. Cl.
CPC ...... *G06F 16/24573* (2019.01); *G06F 16/288* (2019.01)

(58) Field of Classification Search
CPC .......................... G06F 16/24573; G06F 16/288
See application file for complete search history.

(56) References Cited

U.S. PATENT DOCUMENTS

| | | | |
|---|---|---|---|
| 6,697,808 B1 | 2/2004 | Hurwood et al. | |
| 7,266,565 B2 | 9/2007 | Diab | |
| 9,171,096 B2 | 10/2015 | Palanisamy et al. | |
| 9,355,060 B1 | 5/2016 | Barber et al. | |
| 9,813,450 B1 | 11/2017 | Wasiq et al. | |
| 2002/0065673 A1 | 5/2002 | Rooke | |
| 2004/0111728 A1* | 6/2004 | Schwalm | H04L 9/40 707/999.003 |
| 2005/0223034 A1 | 10/2005 | Kaneko et al. | |
| 2007/0156726 A1 | 7/2007 | Levy | |
| 2007/0226196 A1* | 9/2007 | Adya | G06F 16/24539 |
| 2008/0147421 A1* | 6/2008 | Buchmann | G06F 16/2393 705/1.1 |
| 2010/0145984 A1 | 6/2010 | Palanippan | |
| 2011/0225133 A1 | 9/2011 | Manu et al. | |
| 2015/0025925 A1 | 1/2015 | Moore et al. | |

(Continued)

OTHER PUBLICATIONS

Non-Final OA received in U.S. Appl. No. 17/492,209, filed Dec. 23, 2022, 14 pages.

(Continued)

*Primary Examiner* — William P Bartlett
(74) *Attorney, Agent, or Firm* — Klarquist Sparkman, LLP

(57) ABSTRACT

Techniques and solutions are described for storing and retrieving metadata for database artefacts. A client request is received that includes a relevancy identifier. The relevancy identifier is useable to determine a subset of metadata that should be provided in response to the request. Metadata, including in metadata objects or database artefacts, can be reviewed to determine whether it is relevant to the request, such as if the metadata is associated with the relevancy identifier. Different requests from the same client can specify different relevancy identifiers, as, for example, a first set of metadata may be relevant to one client process and another set may be relevant to another client process. While some metadata can be specific to a particular client, at least some of the metadata can be accessed by multiple clients, and at least in some cases different clients can specify the same relevancy identifier.

20 Claims, 24 Drawing Sheets

(56) References Cited

U.S. PATENT DOCUMENTS

| | | |
|---|---|---|
| 2015/0074643 A1 | 3/2015 | Crossley et al. |
| 2015/0199367 A1 | 7/2015 | Hammer et al. |
| 2015/0205823 A1 | 7/2015 | Rundle et al. |
| 2015/0205831 A1 | 7/2015 | Rundle et al. |
| 2015/0278314 A1* | 10/2015 | Fuglsang ............ G06F 16/2452 707/736 |
| 2017/0097832 A1* | 4/2017 | Radhakrishnan ..... G06F 40/186 |
| 2019/0207967 A1 | 7/2019 | Vashist et al. |
| 2019/0273796 A1 | 9/2019 | Allgeier et al. |
| 2019/0303509 A1* | 10/2019 | Greene ................. G06F 16/907 |
| 2020/0192892 A1* | 6/2020 | Portisch ................ G06F 16/955 |
| 2020/0334272 A1 | 10/2020 | Hrastnik |
| 2021/0056100 A1 | 2/2021 | Steinhauser |
| 2021/0316451 A1 | 10/2021 | Kumar et al. |
| 2022/0207061 A1* | 6/2022 | Failer .................... G06F 16/221 |
| 2022/0391541 A1 | 12/2022 | Novotny et al. |
| 2022/0391639 A1 | 12/2022 | Gurumurthy et al. |
| 2022/0398232 A1 | 12/2022 | Sunder et al. |
| 2023/0104441 A1 | 4/2023 | Weigel et al. |

OTHER PUBLICATIONS

European Search Report received in European Application No. 22196519.7, dated Feb. 3, 2023, 8 pages.

\* cited by examiner

```
                                               ┌─200
       204─┐
212
  \    @Scope: [#VIEW, #ENTITY]
    ─annotation Interoperability {
       governanceSchema : String(20) enum {
         ODM;
         VDM;                          ┌─208
       };
216    @Scope: [#VIEW, #ENTITY, #ELEMENT, #PARAMETER]
   ─── originalNameMapping : String;
       productRelevancy : array of String(20);
     };         \
                 ─220
```

FIG. 2

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from   vbak
    left outer to one join vbkd on vbak.vbeln = vbkd.vbeln
                               and vbkd.posnr = '000000' association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer        as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]    //Composition
  _Item,
  vbak.vkorg                                    as SalesOrganization,
  vbak.auart                                    as SalesOrderType,
  vbak.vtweg                                    as DistributionChannel,
  @ObjectModel.foreignKey.association: '_SoldToParty'
  vbak.kunnr                                    as SoldToParty,
  _SoldToParty,
  @DefaultAggregation: #SUM
  @Semantics.amount.currencyCode: 'TransactionCurrency'
  vbak.netwr                                    as TotalNetAmount,
  @Semantics.currencyCode: true
  @ObjectModel.foreignKey.association: '_TransactionCurrency'
  vbak.waerk                                    as TransactionCurrency,
  _TransactionCurrency,
  ...
}
where vbak.vbtyp = 'C';
```

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'     804
@Analytics.dataCategory: #DIMENSION
@AccessControl.authorizationCheck: #CHECK
@Metadata.allowExtensions: true
@Search.searchable: true
define view I_SampleSalesOrder
  as select from    vbak
    left outer to one join vbkd on vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer          as _SoldToParty
    on $projection.SoldToParty = _SoldToParty.Customer
{
  @Search.defaultSearchElement: true
  key cast(vbak.vbeln as vdm_sales_order_preserving_type) as SalesOrder,
  @ObjectModel.association.type: [#TO_COMPOSITION_CHILD]   //Composition
  _Item,
  vbak.vkorg                                    as SalesOrganization,
  vbak.auart                                    as SalesOrderType,
  vbak.vtweg                                    as DistributionChannel,
  @ObjectModel.foreignKey.association: '_SoldToParty'
  vbak.kunnr                                    as SoldToParty,
  _SoldToParty,
  @DefaultAggregation: #SUM
  @Semantics.amount.currencyCode: 'TransactionCurrency'
  vbak.netwr                                    as TotalNetAmount,
  @Semantics.currencyCode: true
  @ObjectModel.foreignKey.association: '_TransactionCurrency'
  vbak.waerk                                    as TransactionCurrency,
  _TransactionCurrency,
  ...
}
where vbak.vbtyp = 'C';
```

808 →
```
@EndUserText.label: 'Auto assigned role for I_SampleSalesOrder'
@MappingRole: true
define role I_SampleSalesOrder {
  grant select on I_SampleSalesOrder
  where ( SalesOrderType ) =
  aspect pfcg_auth ( v_vbak_aat,
                     auart,
                     actvt = '03' );
}
```

812 →
```
@Metadata.layer: #CORE
annotate view I_SampleSalesOrder
  with
{
  @UI.lineItem: [{importance: #HIGH }]
  SalesOrder;
  @UI.lineItem: [{importance: #HIGH }]
  SalesOrderType;
}
```

816 →
```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

Select Statements — 1204

| Object Type | Object Name | Object VersionID | EntityName | PrimaryData SourceName | PrimaryData SourceType | WhereCondition CollectionID | JoinCondition CollectionID | ... |
|---|---|---|---|---|---|---|---|---|
| 1208 | | 1210 / 1212 / 1220 | | 1224 | 1226 | 1228 | 1236 | 1299 |
| DDLS | DDLS1 | 56 | VIEW1 | TABLE1 | TABLE | | | ... |
| DDLS | DDLS2 | 77 | VIEW2 | TABLE2 | TABLE | | | ... |
| DDLS | DDLS3 | 88 | VIEW3 | TABLE3 | TABLE | 1 | | ... |
| DDLS | DDLS4 | 255 | VIEW4 | VIEW1 | VIEW | | 1 | ... |

Association Definition — 1284

| Object Type | Object Name | Object VersionID | Entity Name | Association Name | Association OriginalName | Target Entity Name | Target Entity Type | Target Minimum Cardinality | Target Maximum Cardinality | OnCondition CollectionID | ... |
|---|---|---|---|---|---|---|---|---|---|---|---|
| 1286 | 1287 | 1288 | 1289 | 1290 | 1292 | 1294 | 1295 | 1296 | 1297 | 1298 | 1299 |
| DDLS | DDLS2 | 77 | VIEW2 | _V2 | _V2 | VIEW3 | VIEW | 0 | 1 | 1 | ... |

Conditions — 1232

| Object Type | Object Name | Object VersionID | Condition Collection ID | Group ID | Grouping Ordinal Number | Grouping Operator | Left Group ID | Left Data Source Name | Left Field Name | Left Value | LeftToRight Relation | Right Group ID | Right Data Source Name | Right Field Name | Right Value |
|---|---|---|---|---|---|---|---|---|---|---|---|---|---|---|---|
| 1238 | 1240 | 1256 | 1258 | 1260 | 1262 | 1266 | 1270 | 1264 | 1272 | 1274 | 1268 | 1276 | 1278 | 1280 | 1282 |
| DDLS | DDLS4 | 255 | 1 | 1 | | | | VIEW1 | | | LEFT_OUTER_JOIN | 2 | | | |
| DDLS | DDLS4 | 255 | 1 | 2 | 1 | | | VIEW2 | FIELD2 | | EQUAL | | VIEW1 | FIELD2 | |
| DDLS | DDLS4 | 255 | 1 | 2 | 2 | AND | | VIEW2 | FIELD3 | | NOT_EQUAL | | | | REL |
| DDLS | DDLS3 | 88 | 1 | 1 | | | | TABLE3 | FIELD4 | | EQUAL | | | | x |
| DDLS | DDLS2 | 77 | 1 | 1 | 1 | | | VIEW2 | FIELD3 | | EQUAL | | VIEW3 | VIEW3 | |

DDLS2

```
define view View2                                    1304
  as select from View1
{                                1320
  key View1.Field1 as AliasedField1,
  case View1.Field2
    when 'VAL1' then 'X'
    when 'VAL2' then 'Y'
    else 'Z'              1322
  end as CalculatedField2,                    1324
  concat( View1.Field1, View1.Field2) as CalculatedField3,
  cast( View1.Field3 as DE4 preserving type ) as CalculatedField4
}
                                                        1326
```

DDLS1

```
                          1308
  define view View1
    as select from Table1
  {                    1330
    key Table1.Field1,
        Table1.Field2,
        Table1.Field3  1332
  }      1334
```

TABLE1

```
                      1312
  define table Table1
  {         1340
    key Field1 : DE1 not null;
       Field2 : DE2;
  1342 Field3 : DE3;
  }       1344
```

FIG. 13

1912 ObjectVersionSource

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

1904 ← (arrow to first table)

1908 → (arrow to second table)

DdlsVersion

| DdlsName | DdlsVersionID | CdsEntityName | CdsEntityOriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 19

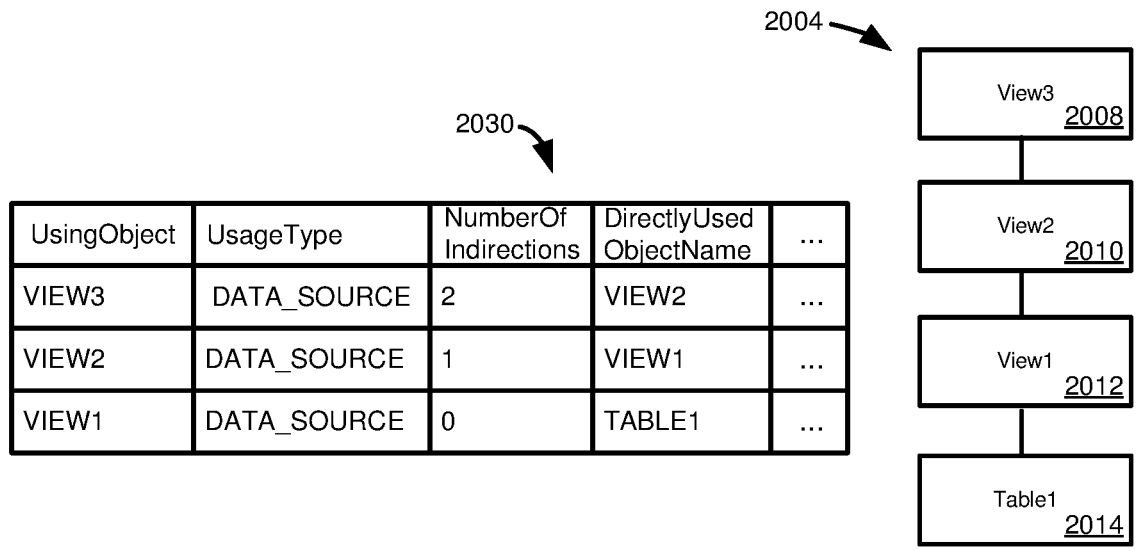

FIG. 20

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 21

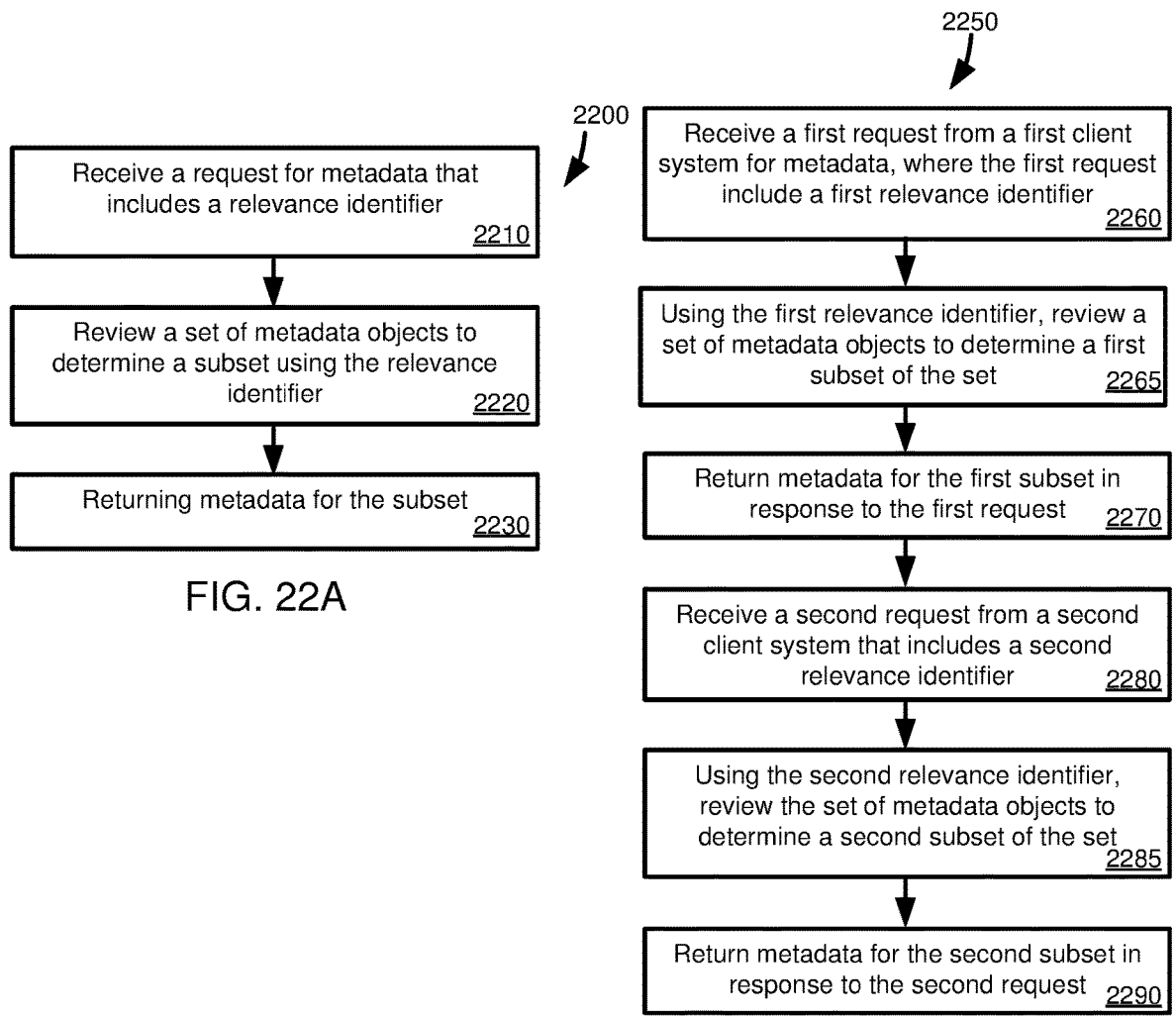

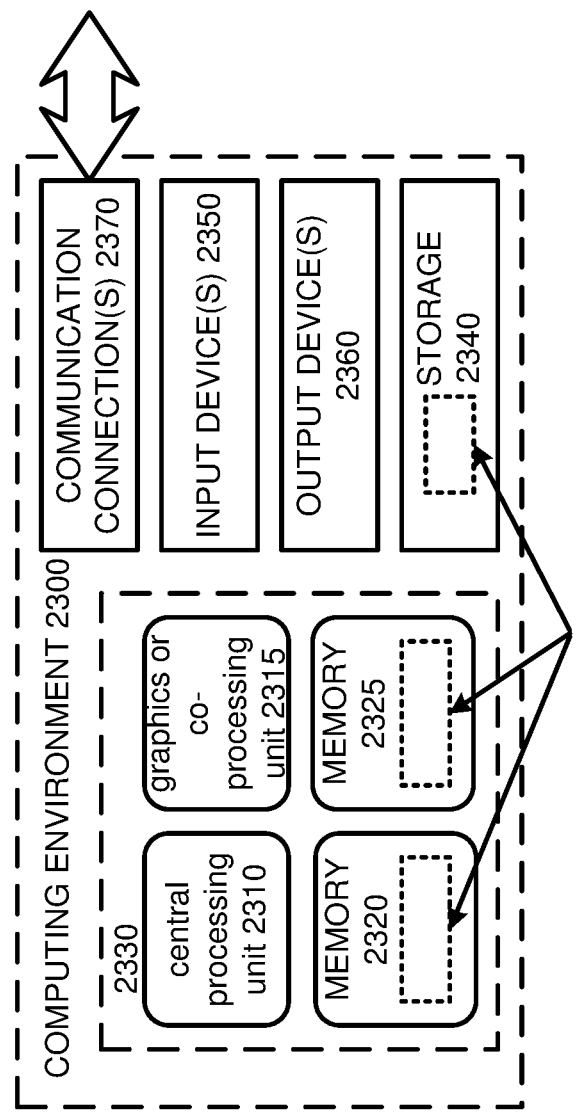

CENTRALIZED METADATA REPOSITORY WITH RELEVANCY IDENTIFIERS

FIELD

The present disclosure generally relates to metadata for data artefacts, for example database artefacts. Particular implementations provide a central metadata repository that can be used to retrieve and store metadata having metadata relevance identifiers that facilitate client systems retrieving relevant subsets of information from the metadata repository.

BACKGROUND

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. In some cases, metadata from one system may be useful in another system. For example, it may be desirable to replicate or transfer data from one system to another, such as when migrating from an on-premise database solution to a cloud-based solution. Or, it may be desirable to make data available to another platform, such as through data federation. However, without access to the metadata use or interpretation of the replicated or federated data may be difficult or impossible. It can be useful to store metadata in a centralized repository available to multiple clients, however not all data in the repository may be of relevance to all clients. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for storing and retrieving metadata for database artefacts. A client request is received that includes a relevancy identifier. The relevancy identifier is useable to determine a subset of metadata that should be provided in response to the request. Metadata, including in metadata objects or database artefacts, can be reviewed to determine whether it is relevant to the request, such as if the metadata is associated with the relevancy identifier. Different requests from the same client can specify different relevancy identifiers, as, for example, a first set of metadata may be relevant to one client process and another set may be relevant to another client process. While some metadata can be specific to a particular client, at least some of the metadata can be accessed by multiple clients, and at least in some cases different clients can specify the same relevancy identifier.

In one aspect, the present disclosure provides a method for determining metadata associated with a relevancy identifier. A request for metadata that includes a relevancy identifier is received. The relevancy identifier can identify a particular client, schema, product, or other information for determining a subset of metadata that should be sent to the client. In the case of a client identifier, the client identifier can be associated with a relevancy profile in the repository (for example, a list or table or database artefacts, components thereof, metadata objects or artefacts, or components thereof, or combinations thereof). In some cases, multiple clients have or use the same relevancy identifier or profile, or a given client can be associated with multiple relevancy identifiers or profiles.

A set of metadata objects is reviewed to determine of a subset of the metadata objects or components that is relevant to the request. In some cases, the set is all of the metadata in the repository matching the relevancy identifier, while in other cases the set is constrained by other criteria, such as the identity of the client. For example, the identity of the client can determine whether the client is authorized to access particular metadata. Metadata for the subset is returned to the client in response to the request.

In another aspect, the present disclosure provides a method for processing metadata requests from multiple clients, where information relevant to different client requests can differ and can be determined based at least in part on relevance identifiers. A request is received from a first client system for metadata, where the first request includes a first relevance identifier. Using the first relevance identifier, a set of metadata objects is reviewed to determine a first subset of the set. Reviewing the set of metadata objects can be implemented as described in conjunction with the previously described aspect of the present disclosure. Metadata for the first subset is returned to the first client in response to the first request.

A second request from a second client system is received that includes a second relevancy identifier. The set of metadata objects is reviewed to determine a second subset of the set using the second relevancy identifier, such as in the manner previously described. Metadata for the second subset is returned to the second client in response to the second request.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 2 is an example metadata listing that includes relevancy information.

FIG. 7 is code for an example metadata model for a database view.

FIG. 8 is code for an example metadata model for a database view, and for metadata models which modify or refer to such example metadata model.

FIG. 12 provides example database tables illustrating how metadata model information presented in FIG. 11 can be stored in a relational format.

FIG. 13 is a schematic diagram illustrating how metadata models can have fields that are defined with respect to other metadata models.

FIGS. 19 and 20 present example tables that can be used to carry out operations requested through a data access service.

FIG. 21 presents example code that can be used to annotate a user interface service displaying metadata model information.

FIGS. 22A and 22B are flowcharts illustrating embodiments of disclosed techniques for determining and sending relevant metadata in response to a client request.

FIG. 23 is a diagram of an example computing system in which some described embodiments can be implemented.

DETAILED DESCRIPTION

Example 1

Overview

Figure 1:
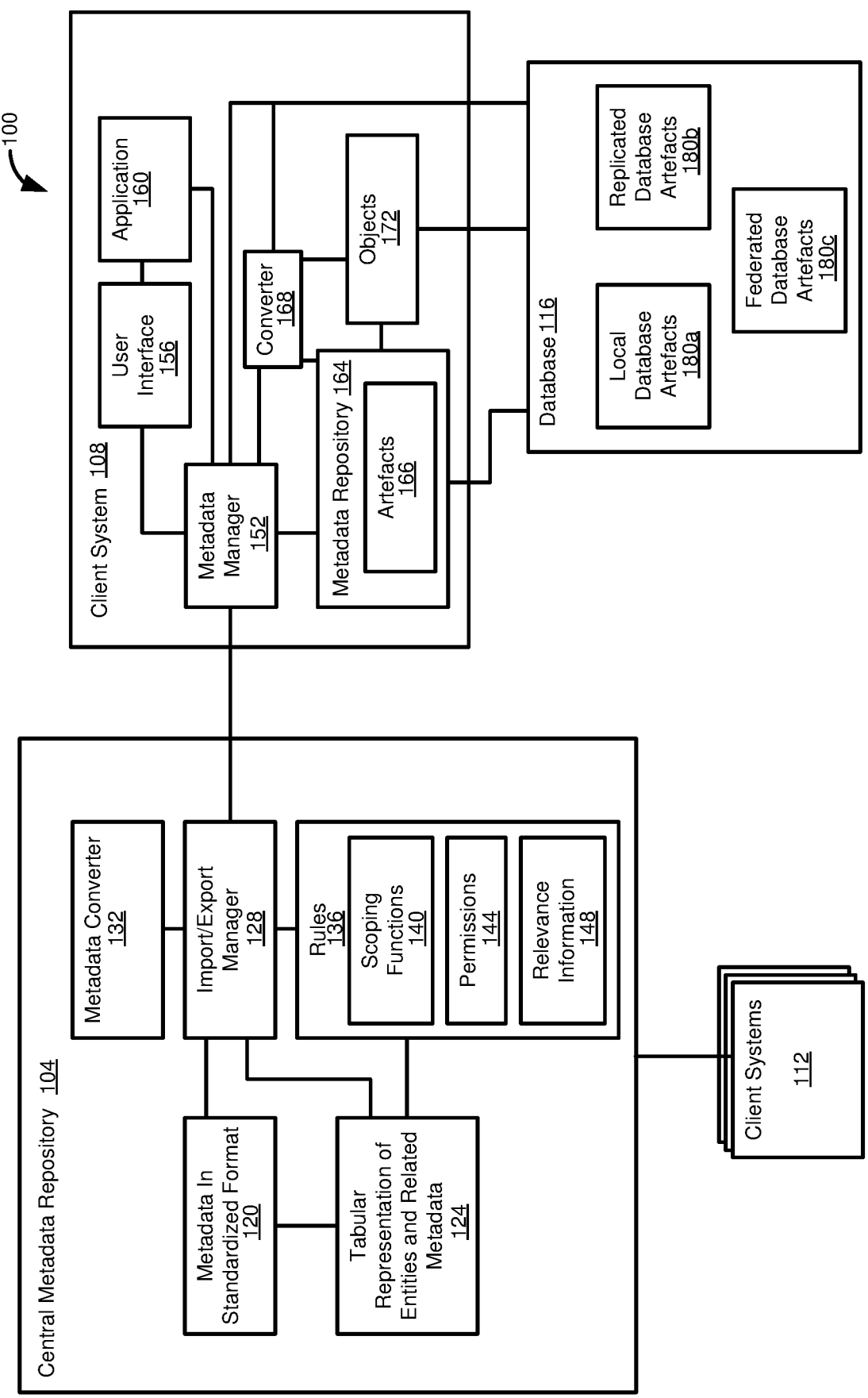
FIG. 1 is a diagram illustrating an example computing environment having a central metadata repository in which disclosed embodiments can be implemented.

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. In some cases, metadata from one system may be useful in another system. For example, it may be desirable to replicate or transfer data from one system to another, such as when migrating from an on-premise database solution to a cloud-based solution. Or, it may be desirable to make data available to another platform, such as through data federation. However, without access to the metadata use or interpretation of the replicated or federated data may be difficult or impossible. It can be useful to store metadata in a centralized repository available to multiple clients, however not all data in the repository may be of relevance to all clients. Accordingly, room for improvement exists.

The present disclosure provides technologies that can be used to retrieve metadata. A central metadata repository is provided that stores metadata provided by a plurality of client systems. Access to metadata can be controlled such that some metadata can be accessible to all clients, some metadata can be accessible to a plurality of approved clients, or some metadata can be accessible to a single client, such as a client which contributed the metadata to the central metadata repository.

Access to metadata can be specified differently for different types of operations. For example, a first set of one or more clients may be allowed to read metadata, a second set of one or more clients may be allowed to update metadata, and a third set of one or more clients may be allowed to delete metadata. In at least some cases, only the client which created/provided the metadata to the central repository is permitted to delete the metadata, or to perform updates which overwrite the metadata. Updates that result in creation of a new version of the metadata or otherwise do not affect the availability of the original metadata can be permitted by a larger number of clients.

The central metadata repository can contain more metadata than is relevant for at least some clients. For example, some database artefacts described by metadata may not be relevant to a particular client, or only a portion of metadata for a database artefact may be relevant. Database artefacts, such as tables or views, are often related to other tables or views, such as by foreign key relationships or associations. For a specified database artefact, all related database artefacts may be relevant to some clients, while for other clients different subsets of related database artefacts may be relevant (including having only the specified database artefact being relevant). The specified database artefact may not be relevant at all to some clients.

Since only a portion of metadata in a central metadata repository may be relevant to clients, and that portion may be different between clients, providing all metadata to a client may waste resources (e.g., processor and storage use, network resources), and can increase the chances of errors occurring when non-relevant metadata is imported into a client system. The present disclosure provides techniques that can be used by clients to specify relevant metadata. The specification can be made in various ways, such as by having a client annotate database artefacts to indicate whether all, a portion, or no metadata is relevant, as well as providing an indication as to what, if any, related database artefacts are relevant. In other implementations, particular scoping functions can be specified that determine related database artefacts (and possibly define the scope of metadata for such database artefacts that is relevant), or a particular schema can be specified as indicating information relevant to a client, such as a particular schema associated with a particular software application, product, product/application component, or subject matter area (such as telecommunication, financial processing, human resources, etc.)

The disclosed techniques can thus be useful in allowing clients to retrieve only selected metadata, such as metadata that has been identified as relevant, including metadata for a new software installation, or providing updated metadata (which can be by a push mechanism or a pull mechanism).

Example 2

Example Computing Environment with Central Metadata Repository

FIG. 1 illustrates an example computing environment 100 that facilitates metadata storage and retrieval. The computing environment 100 includes a central repository 104, that is in communication with a client system 108 and client systems 112. The client system 108 is shown as in communication with a database system 116. The client systems 112 can also be in communication with a database system or can include a database system, or in some cases a client system need not include a database system (or at least a database system that includes transactional-type data, as opposed to a database that stores metadata).

The central metadata repository 104 includes metadata 120, which can be metadata in a standardized format. While in some cases a standardized format can be a format that is common to the client systems 108, 112, in other cases the standardized format can be a format that is more specifically an interchange/exchange/serialized format, such as CSN (core schema notation, such as used in software available from SAP, SE, of Walldorf, Germany) or XML. CSN can be considered as SQL statements enriched with annotations or semantic information.

The central metadata repository 104 can include the metadata 120 in other formats in addition to the standardized format. In one example, the metadata in the standardized format 120 can be stored in one or more relational database tables 124. Storing the metadata 120 in the relational database tables 124 can, among other things, facilitate searching for metadata, or particular database artefacts, including database artefacts that are related to one or more specified database artefacts.

The central metadata repository 104 can include an import/export manager 128. The import/export manager 128 can process requests to read, add, change, or remove metadata in the standardized format 120 (either directly or indirectly, such as by making changes to the relational database tables 124 that are propagated to the metadata 120). The import/export manager 128, in some cases, accesses a metadata converter 132 that can convert metadata between formats, such as between the standardized format and another format (e.g., definitions in ABAP).

The import/export manager 128 can also access various rules 136 useable to determine what metadata is relevant to a particular client request. The rules 136 can include one or more scoping functions 140. The scoping functions 140 can include graph traversal algorithms, such as an algorithm to determine a transitive hull. In some cases a scoping function can specify that the scope includes all hierarchy views related to the selected entity or to a dimension view, related dimension views, text views associated with the dimension views, and optionally additional dimension views within a specified level of indirection. Or a scoping function can include parameters that determine the scope of a traversal, such as retrieving all relevant or specified metadata for a particular star schema, retrieving all metadata for a particular view and all tables or views referenced by that view, or retrieving all or selected metadata for one or more specified/related database artefacts and artefacts within a specified level of indirection.

The rules 136 can also include permissions or authorization information 144. The permissions information 144 can include information identifying clients who are permitted to perform various actions with respect to particular metadata (i.e., metadata associated with a particular database artefact). For example, permission information 144 can dictate which users are allowed to create metadata (and/or associated database artefacts), which users are allowed to delete metadata, which users are allowed to modify metadata, and which users are allowed to read metadata. The clients authorized for particular actions can be the same for different actions or can be different for different actions (for example, in some cases a user can read metadata but may not be able to modify the metadata).

The rules 136 can further include relevance information 148. The relevance information can be used to limit metadata a particular client is able to access using the scoping functions 140 or the permissions information 144. That is, different types of rules 136, such as the scoping functions 140, the permissions information 144, and the relevance information can be used alone or in combination.

The relevance information 148 can be specified in various ways, and at different levels of granularity. As to granularity, the granularity can be specified in terms of all metadata for a database artefact or a plurality of database artefacts, or can be specified in terms of a subset of such metadata, where the selected metadata can be the same for each database artefact (at least of a particular type or in or having a particular schema). For a specific database artefact or set of database artefacts, granularity can be expressed as a single metadata element or a specified collection of metadata elements. Or, granularity can be expressed in terms of a defined set or schema, such as a predefined set of metadata identifiers, metadata data types etc. Having predefined sets or schemas can be useful, for example, when multiple clients may be interested in the same subset of metadata, especially when the requested metadata elements differ between different database artefacts.

Having relevancy information as an annotation can have advantages as compared with other techniques for having database artefacts customized for particular clients/uses. For example, a new/separate view could be created for each client or use. However, while such a technique may be at least somewhat equivalent from a database perspective (e.g., how the data is accessed, such as using SQL), the disclosed techniques can be beneficial in that a single common view is used, and clients/consumers can be aware of this configuration. Having a single common view can, among other things, help with development and interoperability, as it may be assumed that clients use at least some common database artefact (i.e., the "base" artefact, not considering extensions). Without having a reference to a common database artefact, it may be more relevant what database artefacts or extensions are "relevant" to particular clients/consumers.

As discussed, the relevance information 148 can be used in conjunction with a scoping function 140, or the relevance information can be included in the scoping function. Including the relevance information 148 in the scoping function can be useful when multiple clients are likely to want information for the same set of database objects at the same granularity. However, having the relevance information 148 independent of the scoping function 140 can be useful when clients may be interested in the same set of database artefacts, but different clients may want more, less, or different metadata. As an example, two clients (or different users of a single client) may be interested in the same subject matter area (say, telecommunication), application, or application component, but one user may only need high level information and another user may want more granular information, or, even for the same granularity, metadata for one analysis may be different than metadata for another analysis.

Although the relevance information 148 has been described as including relevance identifiers, in some cases the relevance information does not include relevance identifiers but rather applies rules to relevance identifiers, such as determining whether a relevance identifier associated with a request matches a relevance identifier in the metadata 120. In other cases, the relevance information 148 includes relevance identifiers, such as in the form of a client profile or, as described, having a relevance identifier associated with a particular set or schema of metadata.

The import/export manager 128 can return request information to a client system 108, 112, in response to a request received from such systems. In some cases, the import/export manager 128 can notify a client system 108, 112 when metadata which the client has indicated as relevant is added, changed, or deleted. In the cases of updated or added metadata, the import/export manager can proactively send metadata to a client system 108, 112, optionally if the client has elected for this action to occur.

While in some cases a request includes a single relevancy identifier, in other cases a request can include multiple relevancy identifiers (e.g., for multiple applications or products). A request having multiple relevancy identifiers can return metadata relevant to a superset of database artefacts associated with the set of relevancy identifiers.

FIG. 1 shows example components for the client system 108. The client systems 112 may be configured in the same manner as the client system 108, or can have different configurations. However, regardless of the configuration of the client systems 112, at least one such client system contributes metadata to the central metadata repository 104.

The client system 108 includes a metadata manager 152. The metadata manager 152 can send requests to retrieve (or optionally create, update, or delete) metadata to the import/export manager 128. The metadata manager 152 can also receive information from the import/export manager 128. In particular, the metadata manager 152 can receive metadata from the import/export manager 128, either in response to a request sent by the metadata manager 152 or in response to push of such information by the import/export manager 128. The metadata manager 152 can also receive from the import/export manager 128 information such as notices that metadata 120 indicated as relevant to the client system 108 has been updated, created, or deleted, or status messages (such as error message) relating to a request to retrieve metadata or processing of an action related to metadata (e.g., create, update, delete).

The metadata manager 152 can be in communication with one or both of a user, through a user interface 156, or an application 160 (such as using an API). While in some cases the application 160 can communicate with the metadata manager 152 directly, in other cases the application receives instructions from the user interface 156, and those instructions are processed by the application and sent to the metadata manger 152. Similarly, in some cases the user interface 156 communicates with the metadata manager 152 directly, rather than first sending instructions to the application 160. The user interface 156 or application 160 can be presented with the results of a metadata request, or other information, such as notifications that metadata has changed or regarding the status of a CRUD request. Similarly, the user interface 156 or the application 160 can initiate a CRUD request.

Metadata received by a client system 108, 112 can be stored or processed at the client system, a database 116 in communication with such as client system, or both. In some cases, data is received by the metadata manager 152 and is stored as received in a metadata repository 164, as artefacts 166, or in the database 116. In other cases, the metadata can first be processed, such as by sending the metadata to a converter 168. The converter 168 can be configured to convert metadata in the standard format 120 into a format specific to the client system 108 (e.g., ABAP). Or, the converter 168 can maintain the metadata in the same overall format, but can convert the metadata to a different schema. Converted metadata can be stored at the metadata repository 164.

The converter 168 can convert the metadata to other formats, such as a tabular format that can be stored in the database 116. The converter 168 can also instantiate software objects 172, such as instantiating instances of an abstract or composite data type (e.g., creating or updating a BusinessObject, as implemented in software available from SAP, SE, of Walldorf, Germany). In other cases, instantiation of the objects 172 can be initiated by the metadata repository 164, or the metadata repository can include a converter 168.

As discussed, metadata can be stored in the database, optionally along with data described by the metadata (e.g., transactional data or OLAP data derived from transactional data). The metadata is typically stored in local database artefacts 180a, while the data for a particular database artefact (e.g., table or view) can be stored in the local database artefacts 180a or in artefacts that reference a remote table (e.g., on another database system, which can be associated with a particular client system 112 or can be a centralized database, such as a cloud-based database). Artefacts that reference a remote table can include replicated database artefacts 180b and federated database objects 180c. Replicated database objects 180b store data from the remote artefact, while data is fetched from a federated database object 180c when requested.

Example 3

Example Relevancy Information

FIG. 2 provides an example CSN listing 200 illustrating how a database artefact, or metadata for a database artefact, can provide relevancy information useable to identify whether metadata may be relevant to a particular request. Of particular relevance to the present discussion, the listing 200 includes indicators 204, 208 identifying database artefacts or particular elements or metadata associated therewith, to which elements of the listing will apply. The specific database artefacts, elements, or metadata identified by the indicators 204, 208 can vary depending on implementation.

In particular, the indicator 204 indicates than an annotation 212 is relevant to a particular scope specified by a value provided for the indicator 204, such as an instance or a particular type of database artefact (e.g., table or view).

The indicator 208 denotes that an original name mapping element 216 and a product relevancy element 220 can be specified with respect to more granular elements in addition to entire tables or views, such as elements or parameters of a table or view. The original name mapping element 216 can relate the particular data artefact, element, or metadata to another corresponding component. For example, the listing 200 can be a derivative, version, or modification of another listing. Having the original name mapping element 216 can help identify when changes should be propagated to a metadata listing that references a given database artefact/listing, or when two listings should be compared for conflicts.

The product relevancy element 220 is shown as being an array of strings. While product relevancy is the criteria for relevance determination, as described in Example 2, additional or different criteria can be specified, such as specifying particular clients to whom the information associated with the relevancy element 220 is relevant or specifying one or more relevancy categories or schemas that include the relevancy element.

Example 4

Example Metadata for Database Artefact and for an Extension Thereto

Figure 3:
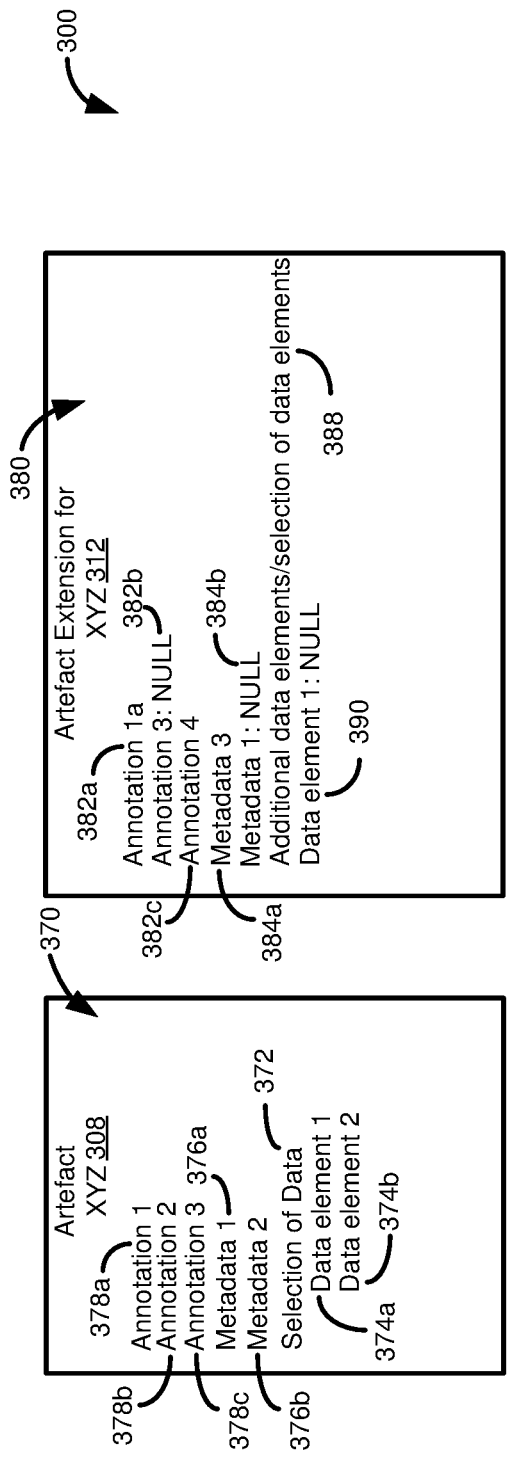
FIG. 3 provides example information that can be included in data and metadata for a particular database artefact, and in an extension for such database artefact.

FIG. 3 illustrates an example of a base database artefact 308 and an example of an extension 312 to the base database artefact, in the form of contents 370 for the base artefact 308 and contents 380 for the extension 312. The contents 370 include a selection of data 372, which includes data elements 374a, 374b. The selection of data 372 can be a query, such as a SQL query. The contents 370 can include metadata elements 376a, 376b, such as elements that provide semantic information about the data elements 374a, 374b. The contents 370 can further comprise annotations 378a, 378b, 378c, where an annotation can indicate properties of the artefact 308 or control the use of the artefact, such as defining whether the artefact is exposed to an end user.

The contents 380 of the extension 312 can add, remove, or alter data elements of the contents 370, and can add or modify annotations of the content 370. As shown, the contents 380 include an annotation 382a that modifies annotation 378a, and an annotation 382b that sets a value of annotation 378c to NULL, and an annotation 382c that has been added to the contents 370. Since the annotation 378b has not been removed or modified, that annotation will be present as in in the artefact 370 when the artefact is merged with the artefact extension 380.

In at least some cases, data elements and metadata can be handled in a similar manner as annotations. The artefact extension 380 shows that a metadata element 384a has been added to the contents 370, and metadata element 376a has been removed by setting the value of the metadata element 376b to NULL using metadata element 384b. The contents 380 can include additional data elements or an additional selection of data elements 388, or can remove a data element, such as a statement 390 in the contents 380 that sets the value of data element 376a to NULL.

Example 5

Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflected in metadata), such as having the data dictionary reflect that dictionary objects are assigned to packages, and thus having a relationship to one another through a package assignment. The information in a data dictionary can correspond to metadata that can be retrieved from a source system by a target system according to the techniques previously described in this disclosure.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 4:
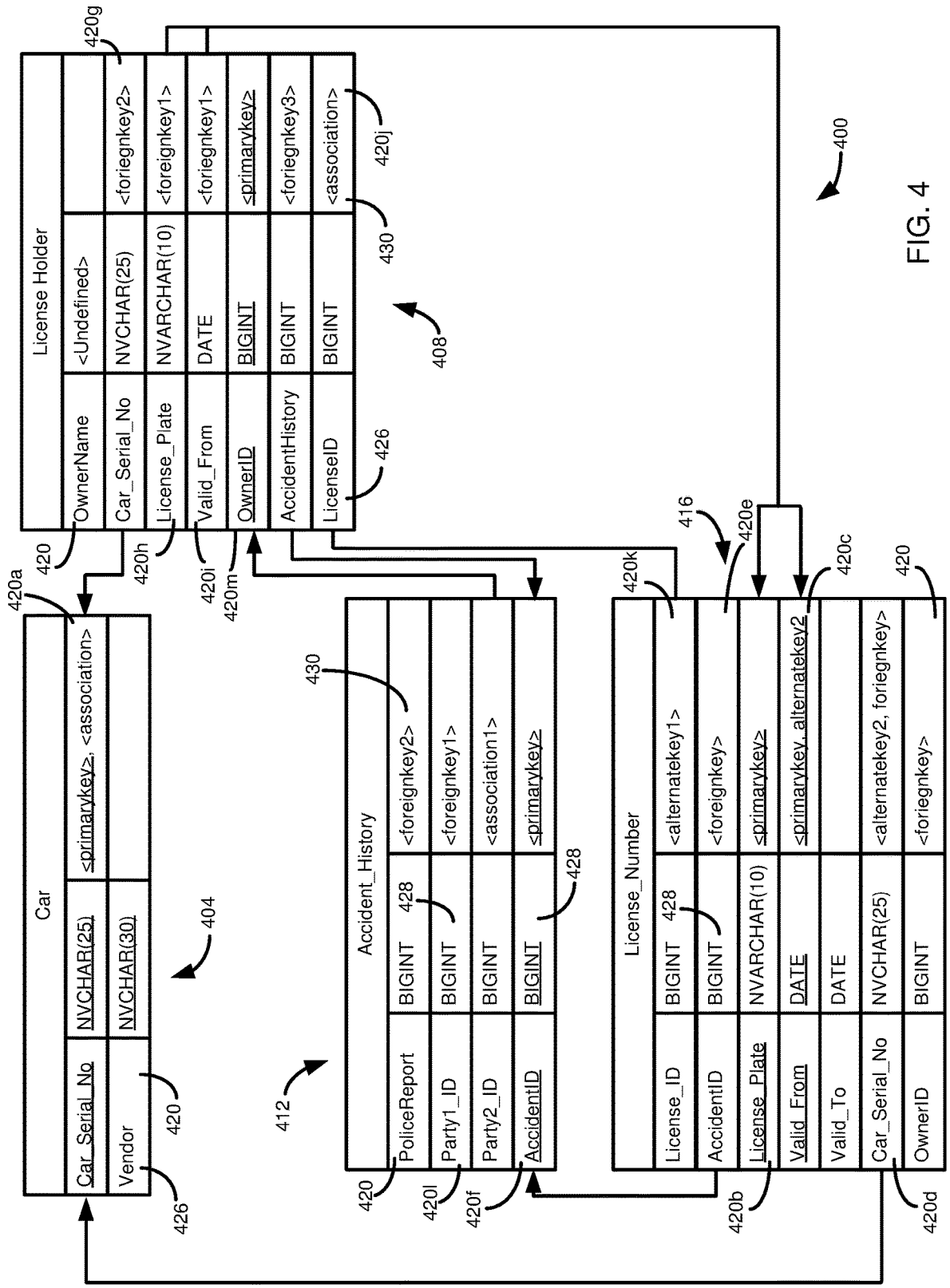
FIG. 4 is a diagram of a database schema showing technical relationships between at least a portion of database tables in the schema.

FIG. 4 is an example entity-relation (ER) type diagram illustrating a data schema 400, or metadata model, related to a driver's accident history. The schema 400 (which can be part of a larger schema, the other components not being shown in FIG. 4) can include a table 408 associated with a license holder (e.g., an individual having a driver's license), a table 412 associated with a license, a table 416 representing an accident history, and a table 404 representing cars (or other vehicles).

Each of the tables 404, 408, 412, 416 has a plurality of attributes 420 (although, a table may only have one attribute in some circumstances). For a particular table 404, 408, 412, 416, one or more of the attributes 420 can serve as a primary key—uniquely identifying particular records in the tuple and being designated as the main method of accessing tuples in the table. For example, in the table 404, the Car_Serial_No attribute 420a serves as the primary key. In the table 416, the combination of attributes 420b and 420c together serve as the primary key.

A table can reference records associated with the primary key of another table through the use of a foreign key. For example, the license number table 416 has an attribute 420d for a Car_Serial_No in table 416 that is a foreign key and is associated with the corresponding attribute 420a of table 404. The use of a foreign key can serve various purposes. The foreign key can link particular tuples in different tables. For example, a foreign key value of 8888 for the attribute 420d would be associated with a particular tuple in table 404 having that value for attribute 420a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 416, for instance, has an alternate key that is formed from attribute 420c and attribute 420d. Thus, a unique tuple can be accessed in the table 416 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 404, 408, 412, 416, and the name 426 and datatype 428 of their associated attributes 420. Schema information may also include at least some of the information conveyable using the flag 430, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 6

Example Table Elements Including Semantic Identifiers

Figure 5:
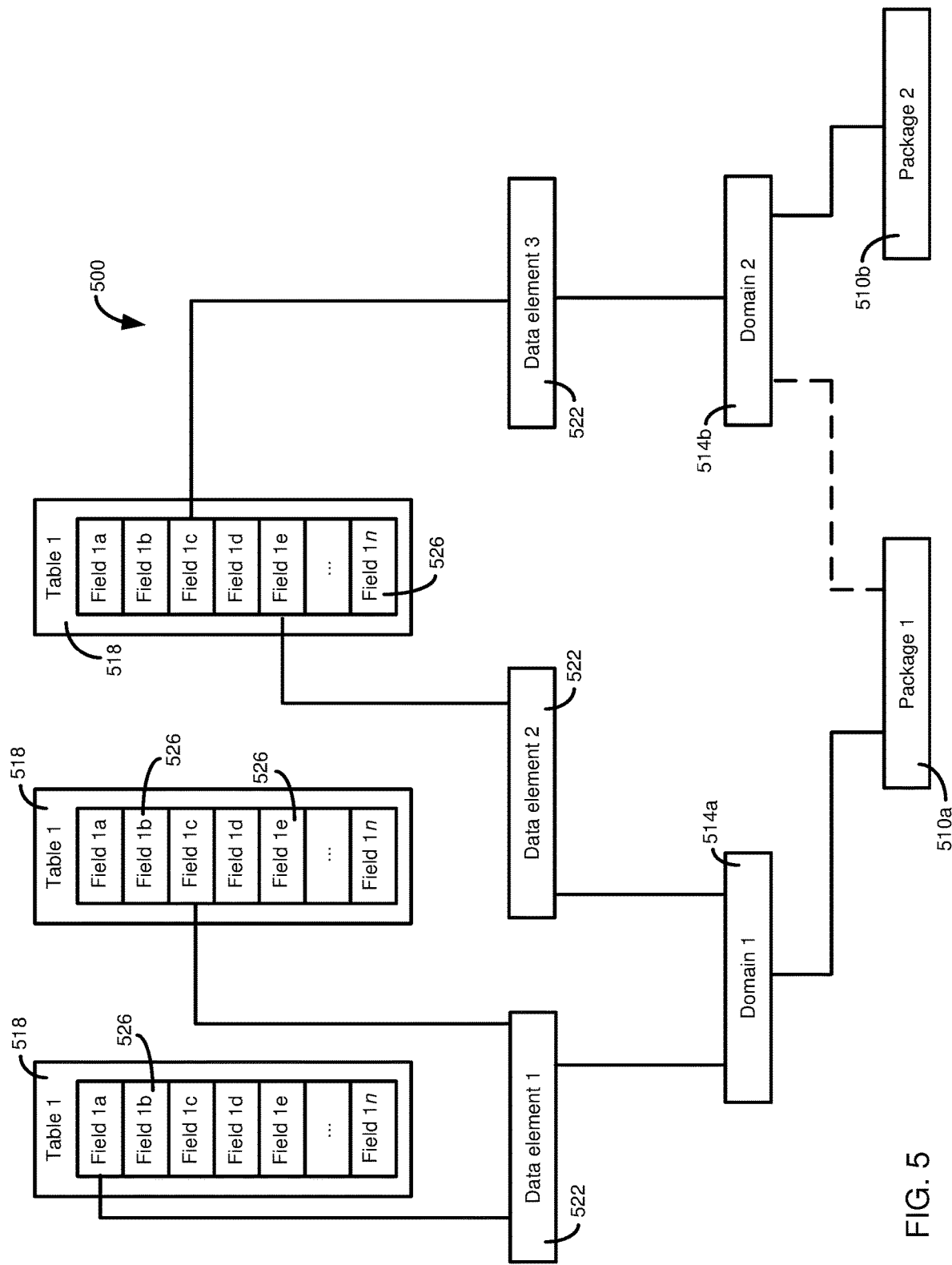
FIG. 5 is a schematic diagram illustrating relationships between table elements that can be included in a data dictionary, or otherwise used to define database tables.

FIG. 5 is a diagram illustrating elements of a database schema 500 and how they can be interrelated. In at least some cases, the database schema 500 can be maintained other than at the database layer of a database system. That is, for example, the database schema 500 can be independent of the underlying database, including a schema used for the underlying database. Typically, the database schema 500 is mapped to a schema of the database layer (e.g., schema 400 of FIG. 4), such that records, or portions thereof (e.g., particular values of particular fields) can be retrieved through the database schema 500.

The database schema 500 can include one or more packages 510. A package 510 can represent an organizational component used to categorize or classify other elements of the schema 500. For example, the package 510 can be replicated or deployed to various database systems. The package 510 can also be used to enforce security restrictions, such as by restricting access of particular users or particular applications to particular schema elements.

A package 510 can be associated with one or more domains 514 (i.e., a particular type of semantic identifier or semantic information). In turn, a domain 514 can be associated with one or more packages 510. For instance, domain 1, 514a, is associated only with package 510a, while domain 2, 514b, is associated with package 510a and package 510b. In at least some cases, a domain 514 can specify which packages 510 may use the domain For instance, it may be that a domain 514 associated with materials used in a manufacturing process can be used by a process-control application, but not by a human resources application.

In at least some implementations, although multiple packages 510 can access a domain 514 (and database objects that incorporate the domain), a domain (and optionally other database objects, such as tables 518, data elements 522, and fields 526, described in more detail below) is primarily assigned to one package. Assigning a domain 514, and other database objects, to a unique package can help create logical (or semantic) relationships between database objects. In FIG. 5, an assignment of a domain 514 to a package 510 is shown as a solid line, while an access permission is shown as a dashed line. So, domain 514a is assigned to package 510a, and domain 514b is assigned to package 510b. Package 510a can access domain 514b, but package 510b cannot access domain 514a.

Note that at least certain database objects, such as tables 518, can include database objects that are associated with multiple packages. For example, a table 518, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 514 (that is, the domains can provide further semantic context for database objects that are associated with an object of another package, rather than being assigned to a common package).

As will be explained in more detail, a domain 514 can represent the most granular unit from which database tables 518 or other schema elements or objects can be constructed. For instance, a domain 514 may at least be associated with a datatype. Each domain 514 is associated with a unique name or identifier, and is typically associated with a description, such as a human readable textual description (or an identifier than can be correlated with a human readable textual description) providing the semantic meaning of the domain. For instance, one domain 514 can be an integer value representing a phone number, while another domain can be an integer value representing a part number, while yet another integer domain may represent a social security number. The domain 514 thus can held provide common and consistent use (e.g., semantic meaning) across the schema 500. That is, for example, whenever a domain representing a social security number is used, the corresponding fields can be recognized as having this meaning even if the fields or data elements have different identifiers or other characteristics for different tables.

The schema 500 can include one or more data elements 522. Each data element 522 is typically associated with a single domain 514. However, multiple data elements 522 can be associated with a particular domain 514. Although not shown, multiple elements of a table 518 can be associated with the same data element 522, or can be associated with different data elements having the same domain 514. Data elements 522 can serve, among other things, to allow a domain 514 to be customized for a particular table 518. Thus, the data elements 522 can provide additional semantic information for an element of a table 518.

Tables 518 include one or more fields 526, at least a portion of which are mapped to data elements 522. The fields 526 can be mapped to a schema of a database layer, or the tables 518 can be mapped to a database layer in another manner. In any case, in some embodiments, the fields 526 are mapped to a database layer in some manner Or, a database schema can include semantic information equivalent to elements of the schema 500, including the domains 514.

In some embodiments, one or more of the fields 526 are not mapped to a domain 514. For example, the fields 526 can be associated with primitive data components (e.g., primitive datatypes, such as integers, strings, Boolean values, character arrays, etc.), where the primitive data components do not include semantic information. Or, a database system can include one or more tables 518 that do not include any fields 526 that are associated with a domain 514. However, the disclosed technologies can include a schema 500 (which can be separate from, or incorporated into, a database schema) that includes a plurality of tables 518 having at least one field 526 that is associated with a domain 514, directly or through a data element 522.

Example 7

Example Data Dictionary Components

Schema information, such as information associated with the schema 500 of FIG. 5, can be stored in a repository, such as a data dictionary. In at least some cases the data dictionary is independent of, but mapped to, an underlying relational database. Such independence can allow the same database schema 500 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 6:
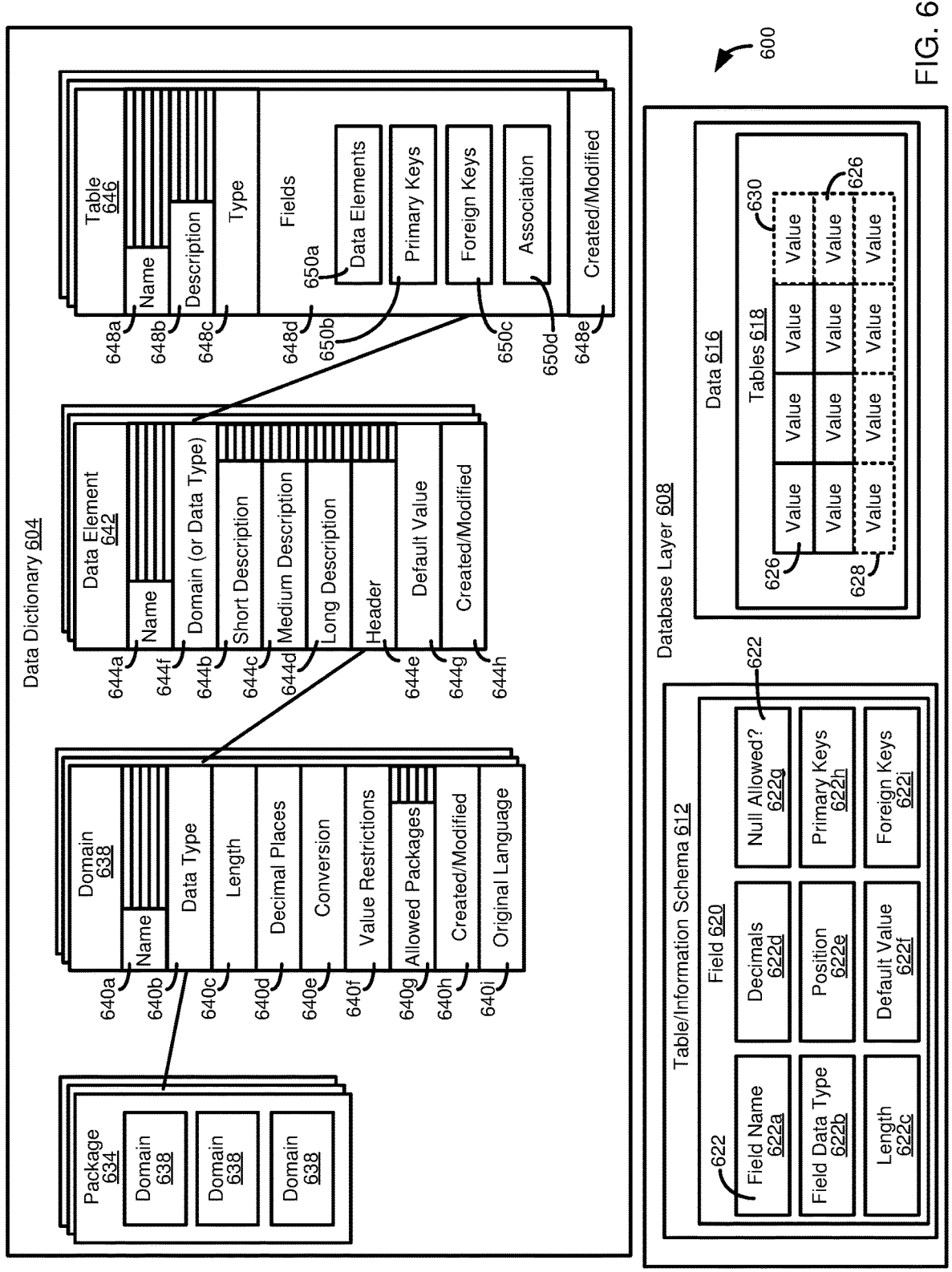
FIG. 6 a schematic diagram illustrating components of a data dictionary and components of a database layer.

FIG. 6 illustrates a database environment 600 having a data dictionary 604 that can access, such as through a mapping, a database layer 608. The database layer 608 can include a schema 612 (e.g., an INFORMATION_SCHEMA as in PostgreSQL) and data 616, such as data associated with tables 618. The schema 612 includes various technical data items/components 622, which can be associated with a field 620, such as a field name 622a (which may or may not correspond to a readily human-understandable description of the purpose of the field, or otherwise explicitly describe the semantic meaning of values for that field), a field data type 622b (e.g., integer, varchar, string, Boolean), a length 622c (e.g., the size of a number, the length of a string, etc., allowed for values in the field), a number of decimal places 622d (optionally, for suitable datatypes, such as, for a float with length 6, specifying whether the values represent XX.XXXX or XXX.XXX), a position 622e (e.g., a position in the table where the field should be displayed, such as being the first displayed field, the second displayed field, etc.), optionally, a default value 622f (e.g., "NULL," "0," or some other value), a NULL flag 622g indicating whether NULL values are allowed for the field, a primary key flag 622h indicating whether the field is, or is used in, a primary key for the table, and a foreign key element 622i, which can indicate whether the field 620 is associated with a primary key of another table, and, optionally, an identifier of the table/field referenced by the foreign key element. A particular schema 612 can include more, fewer, or different technical data items 622 than shown in FIG. 6.

The tables 618 are associated with one or more values 626. The values 626 are typically associated with a field 620 defined using one or more of the technical data elements 622. That is, each row 628 typically represents a unique tuple or record, and each column 630 is typically associated with a definition of a particular field 620. A table 618 typically is defined as a collection of the fields 620, and is given a unique identifier.

The data dictionary 604 includes one or more packages 634, one or more domains 638, one or more data elements 642, and one or more tables 646, which can at least generally correspond to the similarly titled components 510, 514, 522, 518, respectively, of FIG. 5. As explained in the discussion of FIG. 5, a package 634 includes one or more (typically a plurality) of domains 638. Each domain 638 is defined by a plurality of domain elements 640. The domain elements 640 can include one or more names 640a. The names 640a serve to identify, in some cases uniquely, a particular domain 638. A domain 638 includes at least one unique name 640a, and may include one or more names that may or may not be unique. Names which may or may not be unique can include versions of a name, or a description, of the domain 638 at various lengths or levels of detail. For instance, names 640a can include text that can be used as a label for the domain 638, and can include short, medium, and long versions, as well as text that can be specified as a heading. Or, the names 640a can include a primary name or identifier and a short description or field label that provides human understandable semantics for the domain 638.

In at least some cases, the data dictionary 604 can store at least a portion of the names 640a in multiple language, such as having domain labels available for multiple languages. In embodiments of the disclosed technologies, when domain information is used for identifying relationships between tables or other database elements or objects, including searching for particular values, information, such as names 640a, in multiple languages can be searched. For instance, if "customer" is specified, the German and French portion of the names 640a can be searched as well as an English version.

The domain elements 640 can also include information that is at least similar to information that can be included in the schema 612. For example, the domain elements 640 can include a data type 640b, a length 640c, and a number of decimal places 640d associated with relevant data types, which can correspond to the technical data elements 622b, 622c, 622d, respectively. The domain elements 640 can include conversion information 640e. The conversion information 640e can be used to convert (or interconvert) values entered for the domain 638 (including, optionally, as modified by a data element 642). For instance, conversion information 640e can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 638 can be stored in a repository, such as a field catalog.

The domain elements 640 can include one or more value restrictions 640f. A value restriction 640f can specify, for example, that negative values are or are not allowed, or particular ranges or threshold of values that are acceptable for a domain 638. In some cases, an error message or similar indication can be provided as a value is attempted to be used with a domain 638 that does not comply with a value restriction 640f. A domain element 640g can specify one or more packages 634 that are allowed to use the domain 638.

A domain element 640h can specify metadata that records creation or modification events associated with a domain element 638. For instance, the domain element 640h can record the identity of a user or application that last modified the domain element 640h, and a time that the modification occurred. In some cases, the domain element 640h stores a larger history, including a complete history, of creation and modification of a domain 638.

A domain element 640i can specify an original language associated with a domain 638, including the names 640a. The domain element 640i can be useful, for example, when it is to be determined whether the names 640a should be converted to another language, or how such conversion should be accomplished.

Data elements 642 can include data element fields 644, at least some of which can be at least generally similar to domain elements 640. For example, a data element field 644a can correspond to at least a portion of the name domain element 640a, such as being (or including) a unique identifier of a particular data element 642. The field label information described with respect to the name domain element 640a is shown as separated into a short description label 644b, a medium description label 644c, a long description label 644d, and a header description 644e. As described for the name domain element 640a, the labels and header 644b-644e can be maintained in one language or in multiple languages.

A data element field 644f can specify a domain 638 that is used with the data element 642, thus incorporating the features of the domain elements 640 into the data element. Data element field 644g can represent a default value for the data element 642, and can be at least analogous to the default value 622f of the schema 612. A created/modified data element field 644h can be at least generally similar to the domain element 640h.

Tables 646 can include one or more table elements 648. At least a portion of the table elements 648 can be at least similar to domain elements 640, such as table element 648a being at least generally similar to domain element 640a, or data element field 644a. A description table element 648b can be analogous to the description and header labels described in conjunction with the domain element 640a, or the labels and header data element fields 644b-644e. A table 646 can be associated with a type using table element 648c. Example table types include transparent tables, cluster tables, and pooled tables, such as used as in database products available from SAP SE of Walldorf, Germany.

Tables 646 can include one or more field table elements 648d. A field table element 648d can define a particular field of a particular database table. Each field table element 648d can include an identifier 650a of a particular data element 642 used for the field. Identifiers 650b-650d, can specify whether the field is, or is part of, a primary key for the table (identifier 650b), or has a relationship with one or more fields of another database table, such as being a foreign key (identifier 650c) or an association (identifier 650d).

A created/modified table element 648e can be at least generally similar to the domain element 640h.

Example 8

Example Metadata Model

FIG. 7 illustrates a definition of a metadata model 700. The metadata model 700, in particular, represents a view, such as a Core Data Services view of SAP SE, of Walldorf, Germany, and be expressed in a format such as CSN. The metadata model 700 can include a variety of different components, at least some of which can be considered to be metadata models. That is, the metadata model 700 can be a model that is based at least in part on multiple sub-models. The sub-models can specify particular aspects of the overall metadata model 700.

The metadata model 700 can optionally include one or more annotations 704. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 704 can be indicated as annotations using particular syntax elements, such as by preceding an annotation with the "@" symbol. In at least some cases, annotations 704 can also be indicated by placing them in the appropriate portion of a metadata model, such as in a header section or another section designated for annotations. In some cases, annotations 704 can reference other metadata models, such as a metadata model of a data source, or can reference a data source that is associated with a metadata model. In either event, such an association 704 can create a dependency between the metadata model 700 and the other metadata model/data source.

The metadata model 700 can include instructions 708, in this case a SQL statement 710, defining a core metadata model/object having an identifier 712 (which can be used, for example to later access or activate, such as to instantiate, the metadata model). In particular, the instructions 708 shown define a view. The annotations 704 further specify properties of the view, as do other portions of the metadata model 700 that will be further described.

The instructions 708 can specify one or more data sources 716. Data sources 716 can define data to which at least a portion of the metadata of the metadata model 700 will apply, and can also supply additional metadata for the metadata model 700. Note that the metadata model 700 can be, in at least a sense, dependent on referenced data sources 716. For example, if the metadata model 700 relies on particular expected data or metadata of a data source 716, the metadata model may be unusable, have performance issues, or provide incorrect results if the referenced data sources do not include expected data or metadata, or are otherwise inconsistent with how the data source is used in the metadata model. As shown, the data sources 716 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 700 can optionally include specifications of one or more associations 720. An association 720 can define a relationship to another entity. An association 720 can be processed during the use of the metadata model 700, such as being converted to a SQL expression such as a JOIN. Unlike other conditions or elements that are included in the metadata model 700, associations can define a relationship that can at least in some cases be optional, such as being selectively activated depending upon how the metadata model is accessed. For example, an association 720 can be converted to a JOIN condition that uses a table provided in a SELECT statement that references the metadata model 700.

The metadata model 700 can include one or more components 722 that specify how data retrieved using the metadata model should be processed, including to generate values that are associated with other metadata elements of the metadata model. Processing can include calculating values, such as using a formula specified in, or referenced by, the metadata model 700. In particular, a processing component 722 can specify that a particular field value should be treated as an element 724, where an element can be as described in Examples 6 and 7. Thus, the metadata model 700 can include dependencies on how elements are defined, and the metadata model 700 may not be accurate, or useable, if the element definition does not match how it is used, and intended to be used, in the metadata model 700.

The metadata model 700 can optionally include additional components, such as one or more conditions 728, or other operations, such as aggregations, unions, etc., including such operations that are typically supported by a database query language.

Example 9

Example Metadata Model, Including Relationships with Other Metadata Models

FIG. 8 illustrates how metadata models may have dependencies on other metadata models. In particular, FIG. 8 shows a view metadata model 804, which can be the metadata model 700 of FIG. 7. FIG. 8 also illustrates a metadata model 808 for an access control object (such as a DCLS, or data control language source), a metadata model 812 for a metadata extension object (such as a DDLX, or metadata extension), and a metadata model 816 for an extension element object (such as a DDLS, or data definition language source).

The access control object metadata model 808 can be used for restricting access to data that can be retrieved using the view metadata model 804. For example, the view metadata model 804 and the access control object metadata model 808 can be processed together when the view metadata model 804 is activated, such as to generate SQL commands that retrieve data for the view metadata model, but which are filtered or restricted based on the access control object metadata model. As the access control object metadata model 808 references the view metadata model 804, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART". Thus, the first element would be undefined or unusable if the corresponding element did not exist in the view metadata model 804.

The metadata extension object metadata model 812 (which adds annotations to the view metadata model 804) has similar dependencies on the view metadata model, as does the extension element object metadata model 816 (which adds additional elements to the view metadata model).

Example 10

Example Relational Model of Metadata Models

Figure 9:
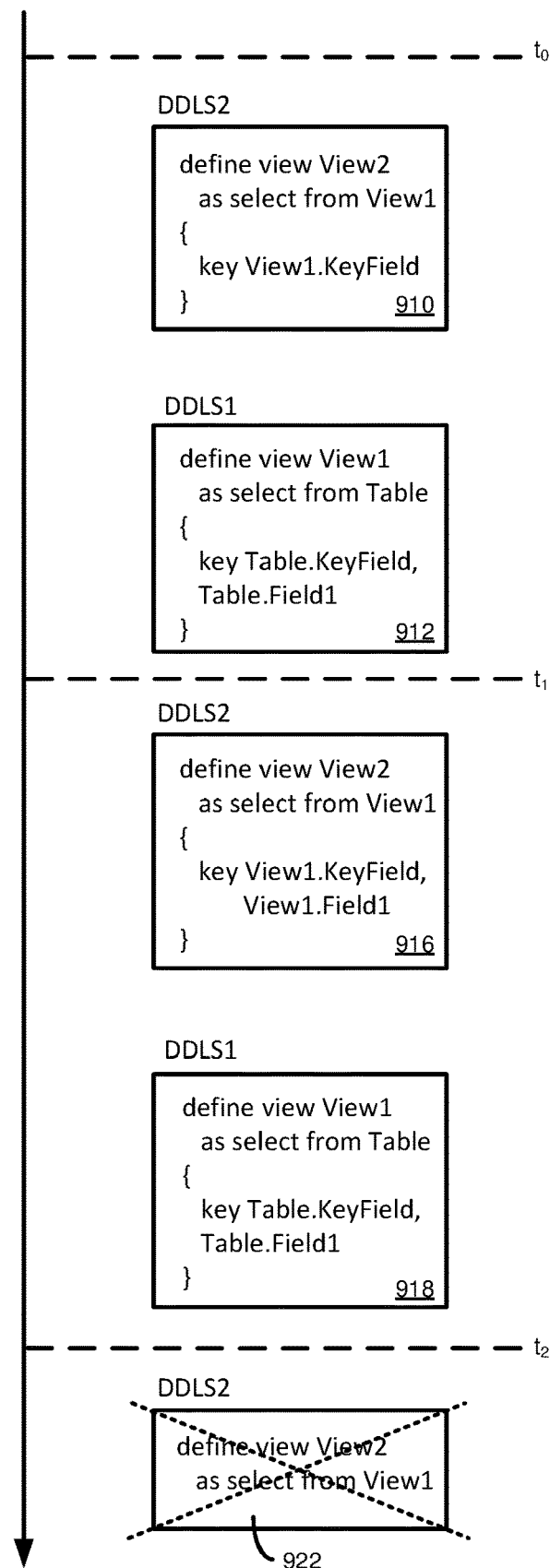
FIG. 9 is a schematic diagram illustrating how metadata models can be interrelated, and updated or deleted, including by multiple computing systems.

FIG. 9 illustrates how metadata models may be dependent on one another, and can be changed over time, which can affect the use or validity of dependent metadata models. At time t0, data definition language versions of metadata models are provided. The metadata models are for two database objects, a model 910 for a View1 and a model 912 for a View2. The model 912 for View2 references View1, as it contains a SQL select statement that defines a particular subset of data defined by the model 910 for View1. Thus, the model 910 includes a dependency on the model 912. In particular, the model 910 depends on View1 existing, and there being a field "KeyField" in View 1.

At time $t_1$, a model 916 for a second version of View2 is received. Compared with the model 912, the model 916 includes another field, Field1, of View1, in the definition of View2. In some cases, the model 916 can be provided as a complete model, while in other cases only changes compared with a prior model version are sent.

At a time $t_2$, the second system uploads an indication 922 that View2 was deleted. Note that, in this case, the deletion of View2 does not affect any described metadata model, as View2 depended on View1, but View1 did not depend on View2. If, instead, View1 had been deleted at time $t_2$, it could be determined that deleting View1 would create issues with View2.

Figure 10A:
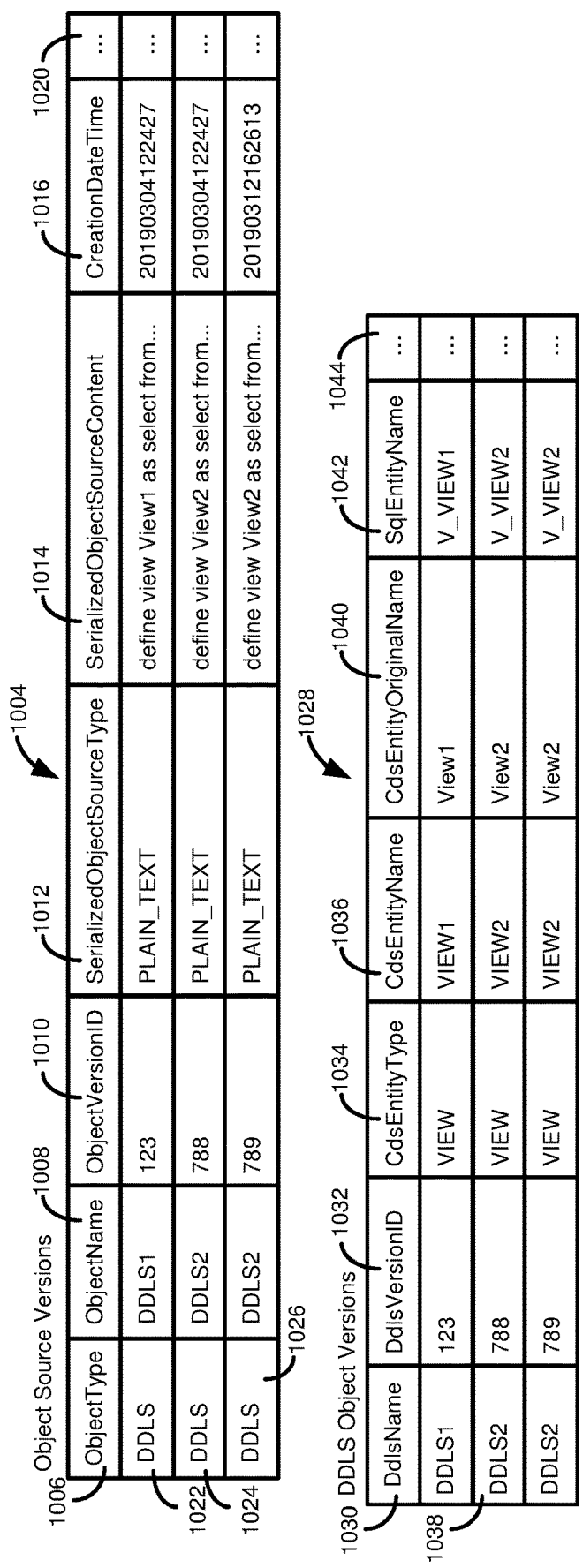
FIGS. 10A and 10B are example tables illustrating how metadata models can be stored in a relational format.
Figure 10B:
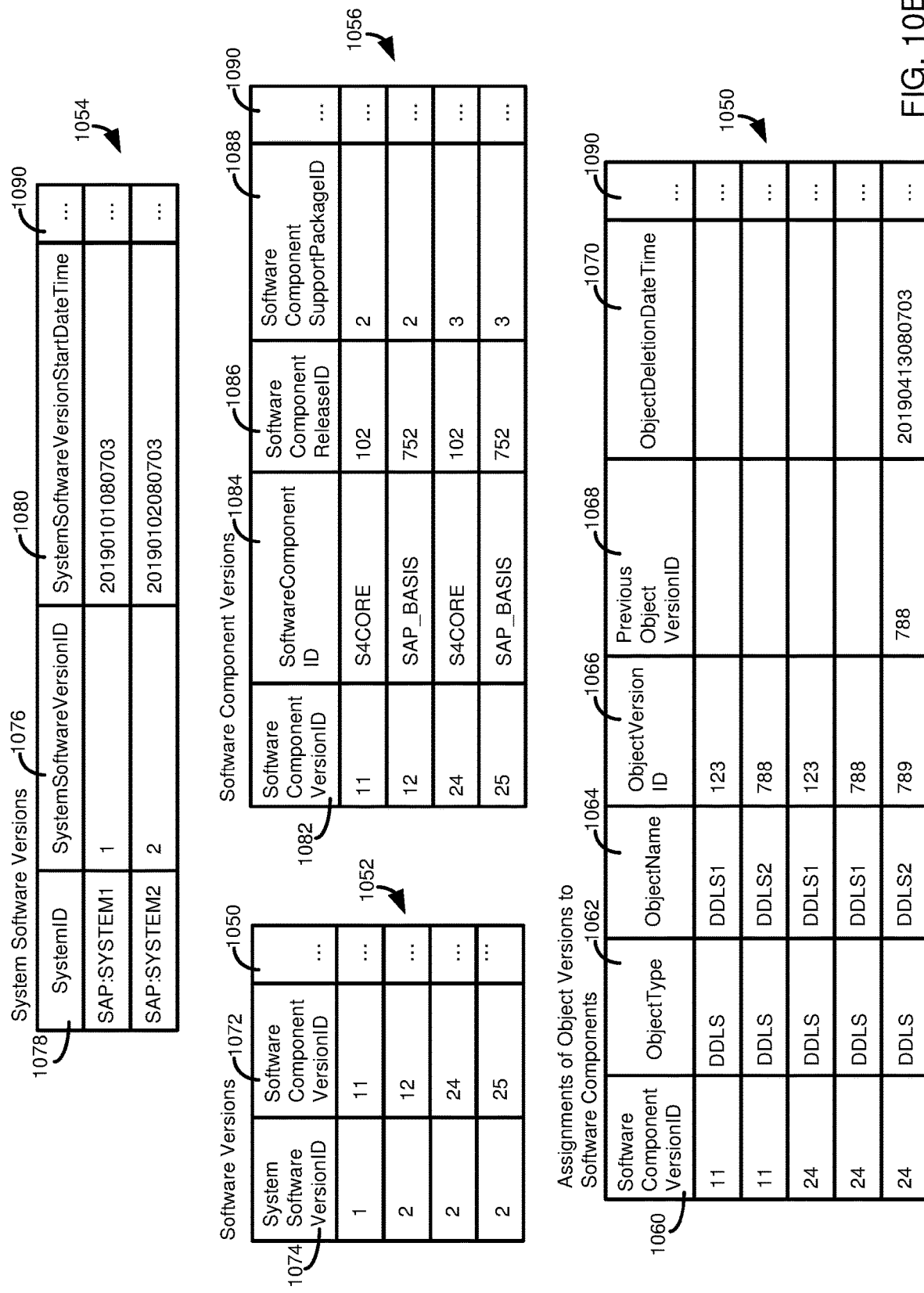

FIG. 9 illustrates the metadata models as defined in a first format, such as a SQL statement defining the views. FIGS. 10A and 10B illustrates how the metadata models shown in FIG. 9 can be converted to a different format, such records in a collection of database tables used to store representations of metadata models. In particular, FIG. 10A shows a table 1004 that includes a field 1006 for an object type associated with a record of the table, a field 1008 holding a name of the object, a field 1010 holding a version identifier associated with the object, a field 1012 providing a type associated with an original format in which the corresponding metadata model was received (e.g., plain text, JSON, XML, CSON, etc.), a field 1014 holding a listing of the original source content (in the type associated with the field 1012), and a field 1016 that includes a timestamp of when the object was received (e.g., with reference to FIG. 9, a timestamp associated with time $t_0$, $t_1$, or $t_2$). The table 1004 can optionally include one or more additional fields 1020.

It can be seen that the table 1004 includes a record 1022 for View1, received at $t_0$, a record 1024 for the metadata model of View2 received at $t_0$, and a record 1026 for the metadata model of View2 received at $t_1$. Note that table 1004 can include information for object source versions, and so type, name, and version information (i.e., fields 1006, 1008, 1010) can be specific for the object as an object source (e.g., a data definition language source, or DDLS).

A table 1028 can include fields for data definition language object versions, which can include a field 1030 for a DDLS name and a field 1032 for a DDLS version identifier, which fields can correspond to the fields 1008, 1010 of the table 1004. The table 1028 can further include a field 1034 that describes an entity (e.g., metadata model) type associated with the corresponding metadata model. Examples of entity types can be table, view, access control, annotation extension, metadata extension, etc.

A field 1036 can include an entity name or identifier, which can be a name or identifier assigned to the metadata model in the declaration of the metadata model, such as in the SQL statements shown in FIG. 9. For example, FIG. 9 shows metadata model 910 as defining a VIEW1, which then supplies the type indicated in field 1034, and the name entered in field 1036 indicated for a record 1038. Note that field 1036 can be a canonical form of the name of the metadata model, and the original name, supplied in the metadata model definition, can be included in a field 1040. Similarly, the canonical name of field 1036 can be associated with other formats, such as a format provided in a field 1042, which, as shown, can be a name used in SQL queries for the metadata model, which can correspond to a name of the metadata model used in a database layer, such as in an information schema. The table 1028 can include one or more additional fields 1044.

As shown in FIG. 10A, all of the information for the metadata models provided at $t_0$ and $t_1$ in FIG. 9 can be retrieved from the tables 1004, 1028, either from individual fields or from the field 1014 with the original source content. FIG. 10B illustrates tables 1050, 1052, 1054, 1056, which can store additional information about the metadata models, including about the systems from which the metadata models, or updates (including deletions) were received. In particular, table 1050 can be used to associate metadata models with software component version identifiers, which can be used to describe the operating environment on the system from which the metadata model was received. Table 1050 includes a field 1060 for the software component version ID associated with the metadata model object name listed in field 1064 (and which corresponds to the field 1008 of table 1004) and the version identifier of field 1066 (which corresponds to the field 1010 of table 1004). A type for the object can be specified in a field 1062.

When a metadata model is changed, the version associated with the identifier in the field 1066 can be linked to a prior version of the metadata model, which can be stored in a field 1068. In the case of a metadata model deletion, a deletion time can be listed in a field 1070 (where no value, or a NULL value, can indicate that the object has not been deleted). In some cases, the deletion field 1070 can be filled out for all versions of the data model. In other cases, the deletion field 1070 is only populated for the last version of the metadata model prior to the deletion.

The table 1052 can associate particular software components, listed in field 1072 (and corresponding to field 1060) with specific system software versions listed in a field 1074. In turn, table 1054 can associate the specific software system versions, in a field 1076, with specific systems indicated by a system identifier in a field 1078, and a timestamp in field 1080 indicating when the system was installed, released, or activated. The table 1056 can include a field 1082 for particular software component versions, corresponding to field 1060 with an identifier of the software component provided in field 1084, a release identifier in field 1086, and a support package identifier in a field 1088. Each of the tables 1050, 1052, 1054, 1056 can optionally include one or more additional fields 1090.

Example 11

Example Metadata Relational Model, Including Query Language Operations

Figure 11:
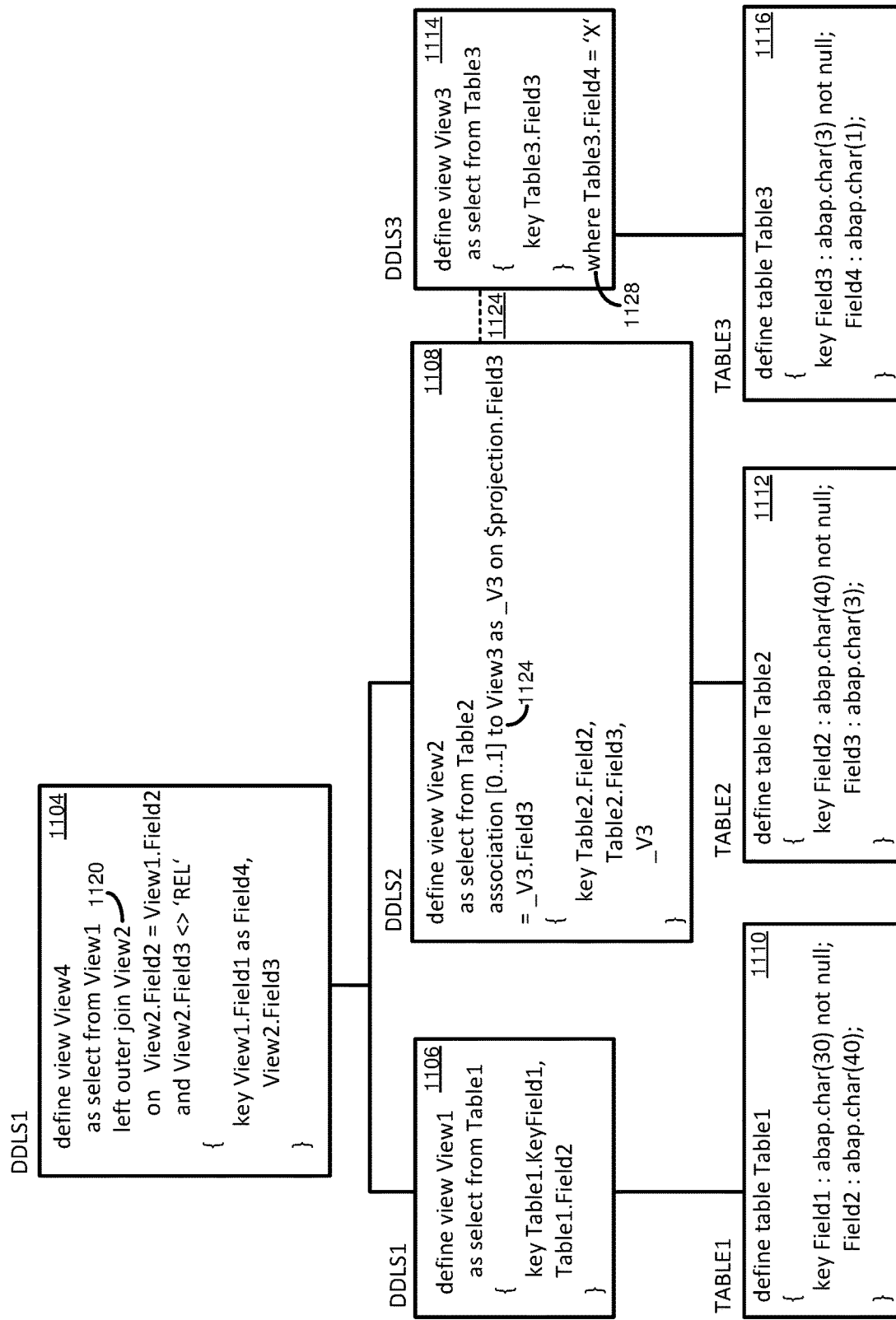
FIG. 11 is a schematic diagram illustrating how metadata models can be interrelated, and can include query operations, such as select statements, join conditions, and where conditions, and how database objects can be related by associations.

FIG. 11 illustrates a scenario where a metadata model 1104, in particular, a view, is defined with reference to two view metadata models 1106, 1108, which can in turn depend on one or more additional data models. The metadata model 1106 depends from a metadata model 1110 for a table, while the metadata model 1108 depends from a metadata model 1112 for a table, and has an association with a metadata model 1114 for another view, which in turn references a metadata model 1116 for a table. These dependencies can be evaluated as described for a scoping function and a traversal component for identifying database artefacts and associated metadata for one or more specified artefacts (including artefacts that are responsive to a particular search/query request).

The view metadata models 1104, 1106, 1108, 1114 include SQL select statements that can be stored in an alternative format, such as in tabular form, as shown in FIG. 12. The select statements of the view metadata models 1104, 1106, 1108, 1114 of FIG. 11 can include additional features/operations that can be stored in an alternative representation, such as a join condition 1120 in the metadata model 1104, an association 1124 between the metadata model 1108 and the metadata model 1114, and a where condition 1128 in the metadata model 1114.

FIG. 12 illustrates a table 1204 that can store information for metadata models having select statements in tabular format. Table 1204 includes a field 1208 for an object type, which for the metadata models 1104, 1106, 1108, 1114 is a data definition language source object. A field 1210 includes a name or identifier for each record, which can be a system assigned name, or a name used for system purposes, for a given object, such as to uniquely identify each object.

Note that the SQL statements in FIG. 11 do not assign the name used in the field 1210. A field 1212 can store an object version identifier value for the object associated with each record. In some cases, the value stored in the field 1212 can be unique to the given object, and can be incremented when a change is made to the object. For example, record 1216 is shown as having an object version identifier of 56 for the DDLS1 object. If the DDLS1 object is changed again, the object version identifier can be incremented to 57.

The table 1204 can include a field 1220 that stores an entity name, which can be an entity name used in the SQL statements shown in FIG. 11. For example, the metadata model 1104 defines a view View4, which is the name provided in the field 1220 for record 1222, corresponding to View4. In at least some cases, each object in the table 1204 can be associated with a primary data source. For example, a SQL statement can have the form "SELECT FROM primaryDataSource," where the identifier of "primaryDataSource" is stored in the field 1224. For metadata model 1104, View4 is defined primarily with respect to View1, and so View1 is listed in field 1224 for record 1222. The primary data source of field 1224 can have a type, such as table or field, which type is provided in a field 1226.

As described, a select statement used in a metadata model can have additional operations, which can be recorded in the table 1204. If an object metadata model definition includes a where condition, an identifier for that condition can be included in a field 1228. Metadata model 1114 includes where condition 1128, and so an identifier for that condition can be entered in the field 1228 for record 1222. The identifier in the field 1228 can identify a particular condition collection, where additional information can be included in a condition collection table 1232, as will be further described. Similarly, if an object metadata model definition includes a join condition, an identifier for the condition can be included in a field 1236. The identifier in the field 1234 can identify a condition collection in the table 1232.

The table 1232 allows condition details associated with the select statements in table 1204 to be further detailed. The table 1232 includes an object type field 1238 and an object name field 1240, which can correspond to the fields 1208, 1210 of table 1204. Note that the join condition of metadata model 1104 is represented by records 1244-1248, the "where" condition of metadata model 1114 is represented by record 1250, and the "on" condition of the association of metadata model 1108 is represented by record 1252.

The table 1232 includes a field 1256 for a version identifier of the object listed in the field 1240, and can correspond to the field 1212. A field 1258 includes condition collection identifiers, and can correspond to the fields 1228, 1236. A group ID field 1260 and a grouping ordinal number field 1262 can be used to preserve the semantics of the conditions as originally expressed (e.g., in SQL). For example, the group ID field 1260 can be used to indicate portions of a condition that are associated with a data source indicated in a field 1264. So, record 1244 is associated with a group identifier in field 1260 of 1, as it is associated with a value of VIEW1 in field 1264, while records 1246, 1248 are associated with a group identifier of 2, as both records are both associated with a value of VIEW2 for field 1264. The values of the grouping ordinal number field 1262 can further identify particular semantics for the records 1246, 1248, such as indicating that record 1246 precedes record 1248 in the original select statement. A grouping operator field 1266 can provide an operator that associates records associated with a particular group identifier value of the field 1260.

For a given operator or relation listed in a field 1268, fields 1270, 1264, 1272, 1274 can list a left group identifier, the left data source name, a left field name, and a left value, respectively. Similarly, fields 1276, 1278, 1280, 1282 can provide a right group identifier, a right group source name, a right field name, and a right value, respectively. "Left" and "right" refer to the position of the values with respect to the operator of the field 1268.

It can thus be seen that the records of the table 1232 can be used to reconstitute the operations or conditions of the metadata models in the format shown in FIG. 11. Although the table 1232 may not explicitly list a type of operation or condition, that information can be gathered from the fields 1228, 1236 of the table 1204 (or from the table 1284, as will be further described).

An association definition table 1284 can define associations included in metadata models, such as models provided in the format shown in FIG. 11, and can include an object type field 1286, an object name field 1287, an object version identifier field 1288, and an entity name field 1289, which can be as described for the fields 1208, 1210, 1212, 1220 of table 1204. A field 1290 can store a standardized version of an object identifier (e.g., an identifier of an object metadata model) listed in a field 1292, which can be the object name as included in the association definition in the original metadata model, such as the association 1124. A field 1294 can provide a name of the associated entity, and a type associated with the entity (e.g., table, view) can be provided in a field 1295. An association can be associated with a minimum cardinality and a maximum cardinality, fields 1296 and 1297, respectively. A field 1298 can include a condition collection identifier, which can correspond to the field 1258 of the table 1232.

Taking the example association 1124 of FIG. 11, the record 1252 sets forth the condition defined for the association (i.e., the "on" condition). For example, values in a FIELD3 of the table referenced by the view 1108 being defined being equal to a FIELD3 of the associated view defined in metadata model 1114, which in turn are associated with the table defined in metadata model 1116.

The tables 1204, 1232, 1284 can optionally include one or more additional fields 1299.

Example 12

Example Relational Metadata Model, Including Field Definitions and Relations

In some cases, a metadata object, such as a view, can include fields that are calculated or otherwise based at least in part on elements (e.g., fields) of one or more other metadata models. The calculations can be explicitly specified in the metadata model definition, or can be referenced in the model definition, such as by calling in a built in function or referencing a function in another metadata model, in a library, an API call, etc.

FIG. 13 illustrates a metadata model 1304 that defines a view with reference to a metadata model 1308, that in turn references a table defined by a metadata model 1312. The metadata model 1304 includes four fields, 1320, 1322, 1324, 1326 that are derived from fields in the metadata model 1308. The metadata model 1308 includes three fields 1330, 1332, 1334 that are selected from the table defined by the metadata model 1312. The table defined by the metadata model 1312 includes three fields 1340, 1342, 1344 that are declared/defined in that metadata model.

Figure 14:
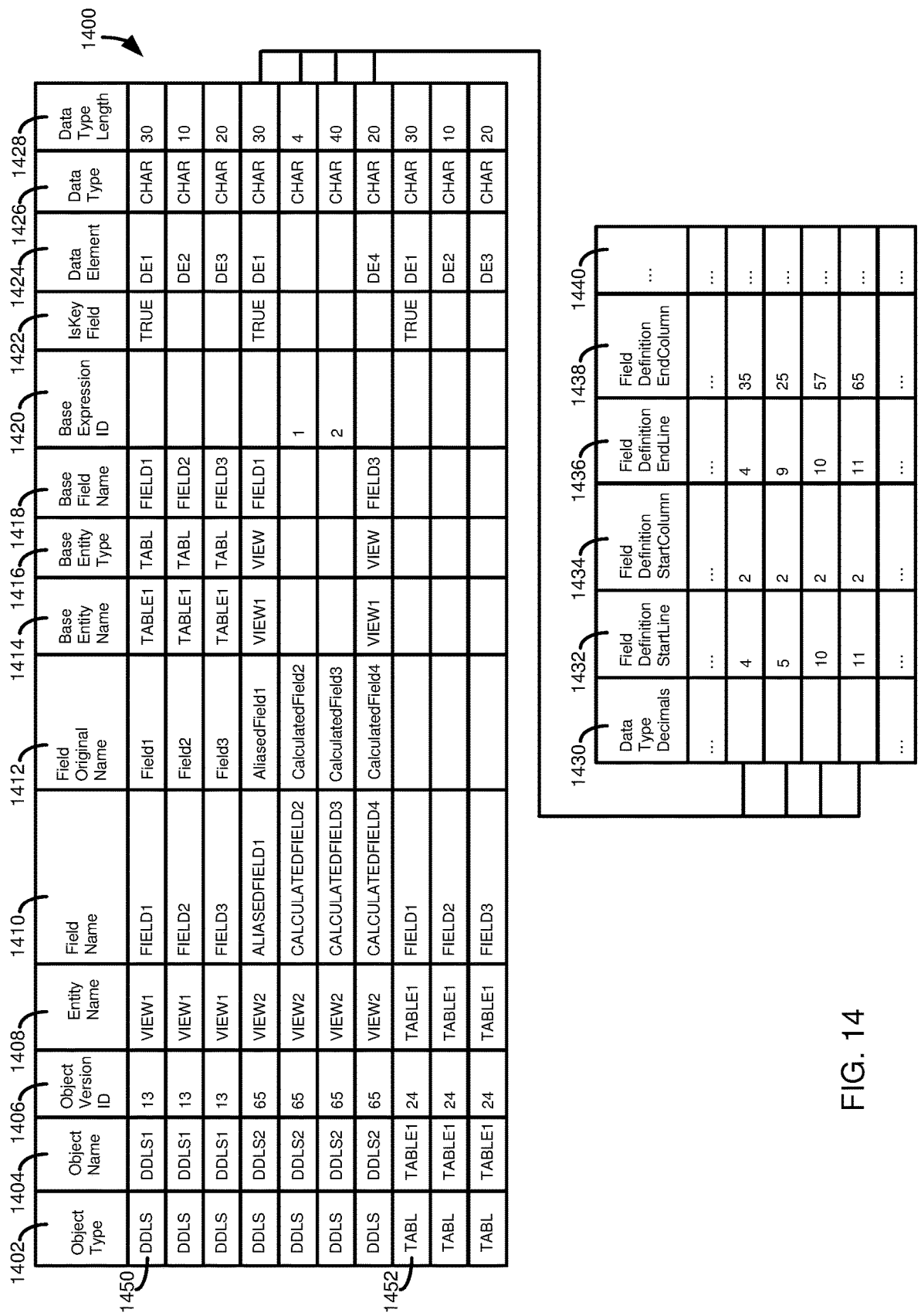
FIG. 14 provides an example database table illustrating how metadata model information presented in FIG. 13 can be stored in a relational format.

FIG. 14 illustrates a table 1400 that can be used to summarize the fields used in the metadata models 1304, 1308, 1312. The table 1400 includes a field 1402 that indicates the type of object with which the field is associated, such as being associated with a table or a data definition language source object (e.g., a view). A name of the object is provided in a field 1404, which can be an object name used by, or supplied by, a system with which the metadata model is used, or, for example, by a metadata service. A version identifier for the object can be provided in a field 1406, which, as discussed for other metadata model representations, can be a unique number for each object, and can be incremented as the object is changed. An entity name field 1408 can include a name that is associated with the metadata model, such as a name that is defined in the declaration of the metadata model.

Each metadata object can be associated with one or more fields, and a field 1410 can store a standardized representation of a field name provided in a field 1412. For example, the field 1410 can store a name that removes formatting/capitalization (e.g., lower case letters) from the field name listed in the field 1412. As described, metadata models may incorporate fields from other metadata models. The immediate source of the field can have a name, provided in a field 1414, and can have a type, such as a table or view, and this type can be provided in a field 1416. The name of the field in the immediate source can be different than the name of the field in the metadata model into which it is incorporated, so a field 1418 can include the name of the field in the source metadata model.

Calculated fields can be associated with an expression, and an identifier for the expression can be provided in a field 1420, which can be used to access the expression, such as an expression stored as a representation in one or more other tables. A field 1422 can indicate whether the field is a key field (e.g., a field used in a primary key). Fields can be associated with a data type, which can be listed in a field 1426, and a data type can be associated with additional semantic or technical information, such as in a data element, an identifier for which can be provided in a field 1424. Often, a data type associated with a field 1426 (and in turn with the field 1424) can have a length, such as number of digits or characters that are allowed, and this information can be included in a field 1428.

Numerical fields that allow for the use of decimals can be associated with a value (e.g., a number of decimal places allowed) through a field 1430. Fields 1432, 1434, 1436, 1438 can be used to define where in a source metadata model a definition of the expression appears, such as a start line, start column, end line, and end column, respectively. The table 1400 can optionally include one or more additional fields 1440.

Figure 15:
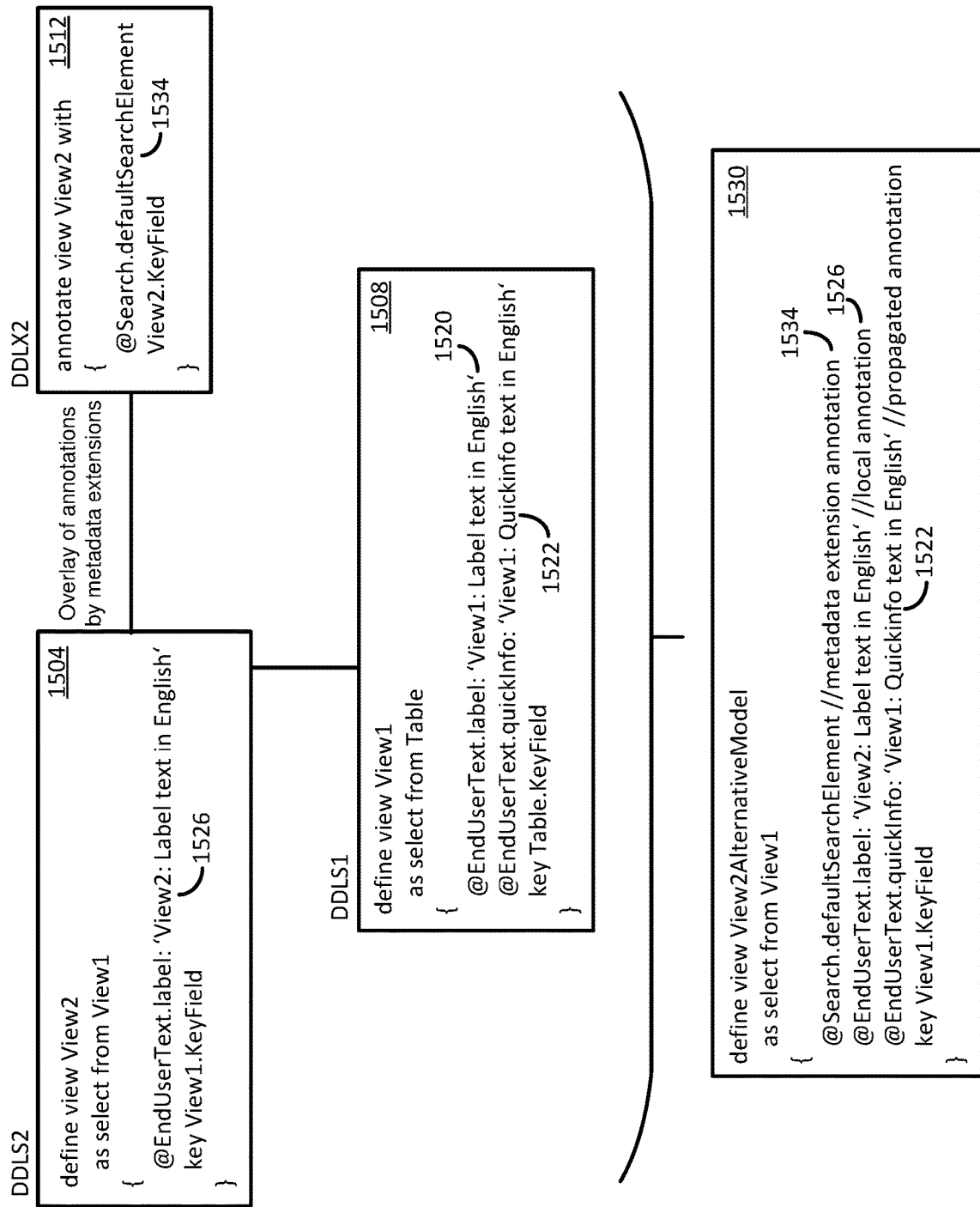
FIG. 15 is a schematic diagram illustrating how metadata models can be related, including metadata models having annotations and metadata models that annotate other metadata models.

As an example of how the table 1404 can be used to represent fields from the metadata models of FIG. 15, consider record 1450, associated with the metadata model 1508. Metadata model 1508 is for a view, VIEW1, and references a Field1 of Table1 (defined by the metadata model 1512), which is a key field. Record 1452 corresponds to the definition of Field1 of Table1 in the metadata model 1512, where Field1 is defined as a key field, that has data element type DE1, and may not be a null value. Record 1450 includes the name of the object, VIEW1, in field 1408, the name, FIELD1, of the field in the object in field 1410, the original name, Field1, of the field in the object in field 1414, the name of the entity where the field is referenced from, TABLE1, in field 1416, the type of the referenced entity, TABL (for table) in field 1416, and the name of the field, FIELD1, in the referenced entity in field 1418. Field 1422 of record 1450 is set to TRUE, indicating that the field associated with record 1450 is a key field, while field 1424 specifies that the field has a data element type of DE1, which fields 1426 and 1428 indicate is a character data type of length 30.

Example 13

Example Relational Metadata Model, Including Annotations

Figure 16:
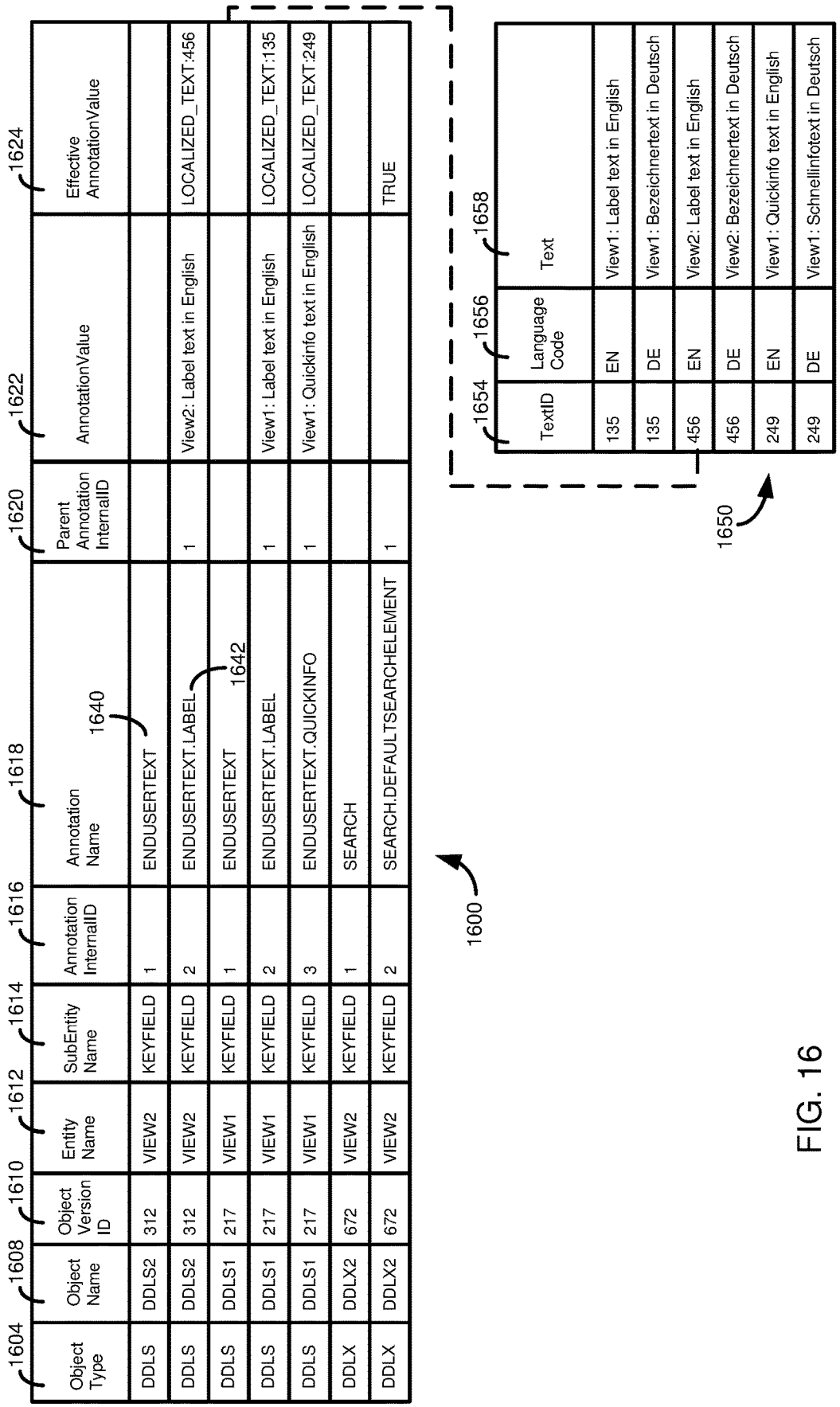
FIGS. 16 and 17 provide example database tables illustrating how metadata model information presented in FIG. 15 can be stored in a relational format.

As described in Example 8, a metadata object, such as a view definition, can include annotations. FIG. 15 illustrates how metadata objects, which can have dependencies on one another, can have annotations, which can be stored in another format, such as the format shown in the table 1600 of FIG. 16.

FIG. 15 includes a metadata model 1504 for a view, View2, which is defined with respect to another view, View1, defined in metadata model 1508. A metadata model 1512 for a metadata extension, DDLX2, provides additional metadata elements for the metadata model 1504. The metadata model 1508 includes two annotations, 1520, 1522 that may be incorporated into the metadata model 1504. However, the annotation 1520, which provides a label for View1, is superseded by an annotation 1526 defined in the metadata model 1504 for View2. An annotation can be superseded, in some cases, if the annotation has the same name or type (e.g., "@EndUserText.label" as shown) in the referencing metadata model as in the referenced metadata model.

Metadata model 1530 illustrates an "effective" representation of the metadata model 1504, including annotations incorporated into the metadata model 1504 by dependency. It can be seen that the effective metadata model 1530 includes the annotation 1526, but not the annotation 1520. As the annotation 1522 for the metadata model 1508 is not superseded, it is included in the effective metadata model 1530, as is an annotation 1534 from the metadata model 1512.

The table 1600 can summarize the annotations of the metadata models of FIG. 15. The table 1600 includes a field 1604 for an object type associated with the metadata model which is annotated by a record representing an annotation. As shown, the field 1604 includes values of "DDLS" for views, or "DDLX" for metadata extension objects. A field 1608 can provide a name of the object, such as a system name, while a field 1612 can provide an object name defined by the declaration of the object. A field 1610 can provide a version identifier for the object. A field 1614 can provide a name of a subentity associated with an annotation, which can be, for example, a particular view field to which an annotation applies.

A field 1616 can provide an annotation internal identifier, which can be used to distinguish between multiple annotations for a metadata model, and can be used to provide an ordering of annotations when multiple annotations are present in a metadata model. A value of the field 1616 can also be used to correlate a base or parent annotation or annotation type with a sub-annotation, as will be further described. An annotation name can be included in a field 1618, which can be a type (or class) or subtype (or class method or class data member) of an annotation. A field 1620 can provide an identifier for a parent annotation. For example, record 1640 assigned an annotation internal identifier of "1" to the "ENDUSERTEXT" annotation. "ENDUSERTEXT" can be a base annotation type, and record 1642 can include the subtype of the annotation, "ENDUSERTEXT.LABEL," where the value of "1" in field 1620 indicates that the record 1642 refers to the annotation of record 1640.

A value of the annotation as defined in the declaration of the metadata model can be provided in a field 1622. The value in the field 1622 represents the explicitly defined value assigned to the annotation. An effective value assigned to the annotation can be indicated in a field 1624. For example, the annotation @Search.defaultSearchElement has the effective value "TRUE" even though this is not explicitly captured in the declaration of the metadata model but automatically derived from the annotation defaulting logic. Furthermore, in the example shown, the effective value for language dependent texts can be specified with respect to an identifier in a table 1650, where the value in the field 1624 corresponds to a value in a text identifier field 1654. The table 1650 is also shown as including a field 1656 that provides a code for a language associated with the text, and the actual text to be displayed can be provided in a field 1658.

Figure 17:
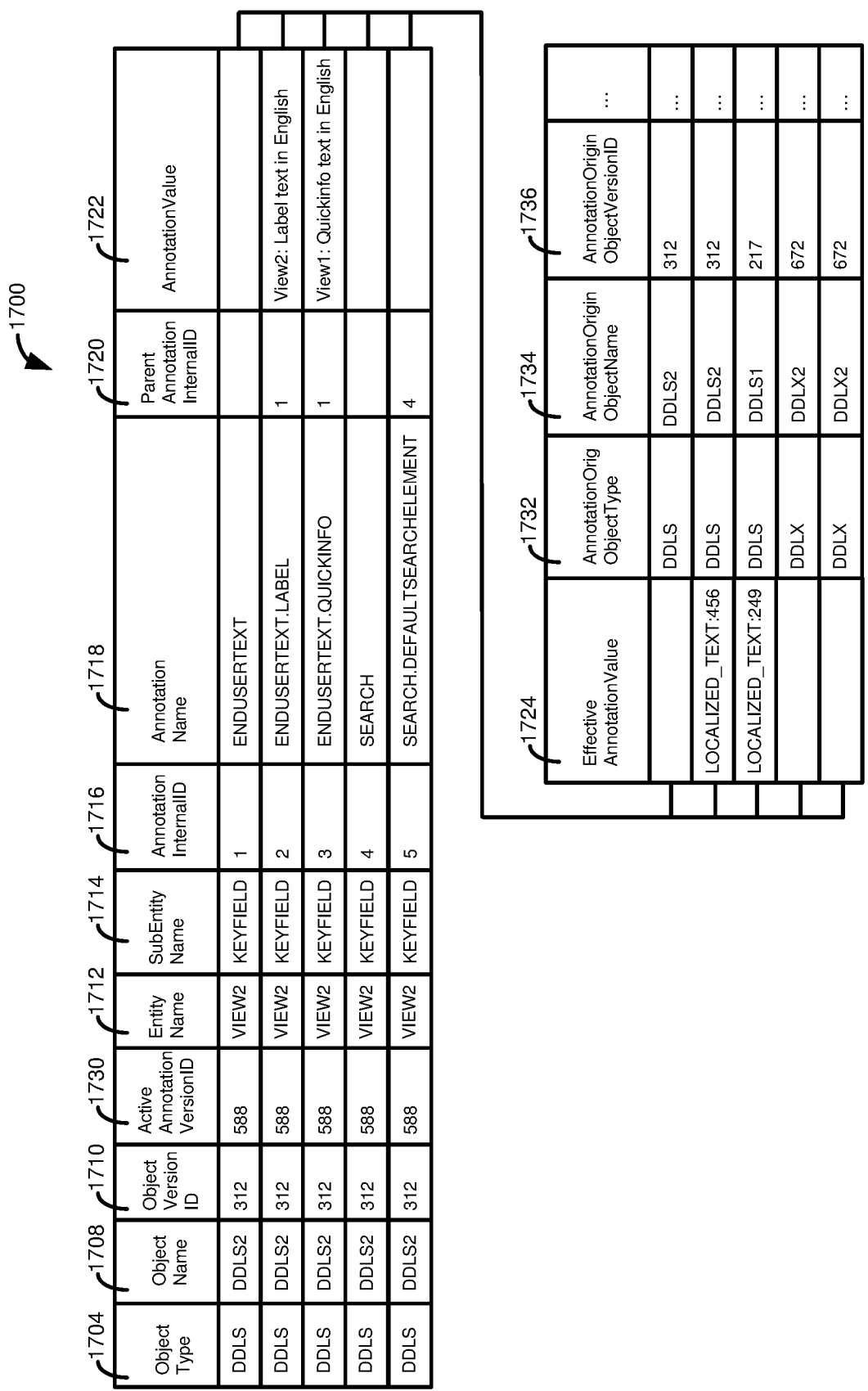

The table 1600 can store information for all annotations that are incorporated into a particular metadata model. However, as described, some of the annotations may not be "active," in that, for instance, a locally declared annotation may overwrite an imported or referenced annotation. Similarly, in some cases annotations from multiple referenced sources (e.g., metadata models) may overlap or conflict, in which case only one (or, generally, a subset) of the annotations may be designated as active. It can be beneficial to separately maintain a repository of active annotations, which can be stored as shown in the table 1700 of FIG. 17.

The table 1700 can include a field 1704 for an object type, a field 1708 for an object name, a field 1710 for an object version identifier, a field 1712 for an entity name, a field 1714 for a subentity name, a field 1716 for an annotation internal identifier, a field 1718 for an annotation name, a field 1720 for a parent annotation identifier, a field 1722 for an annotation value, and a field 1724 for an effective annotation value, which fields can be implemented at least generally described for the similarly titled and numbered fields of the table 1600.

The table 1700 can include additional fields, such as an active annotation version identifier field 1730. Note that the active annotation version identifier in the field 1730 can have a value that is different than the object version identifier in the field 1710. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., metadata model). Accordingly, a field 1732 can store the object type associated with the annotation (either the local object type or the object type of the object from which the annotation is being imported), while a field 1734 can store the name of the originating object. A field 1736 can store the version identifier of the originating object.

Example 15

Example API for Central Metadata Repository

Users or applications can access stored metadata models, such as metadata maintained in one or more of the tabular formats described in Examples 11-14. In some cases, the information can be accessed via an API, such as a web-based API using REST services. In a particular example, the API can use the OData protocol.

Figure 18:
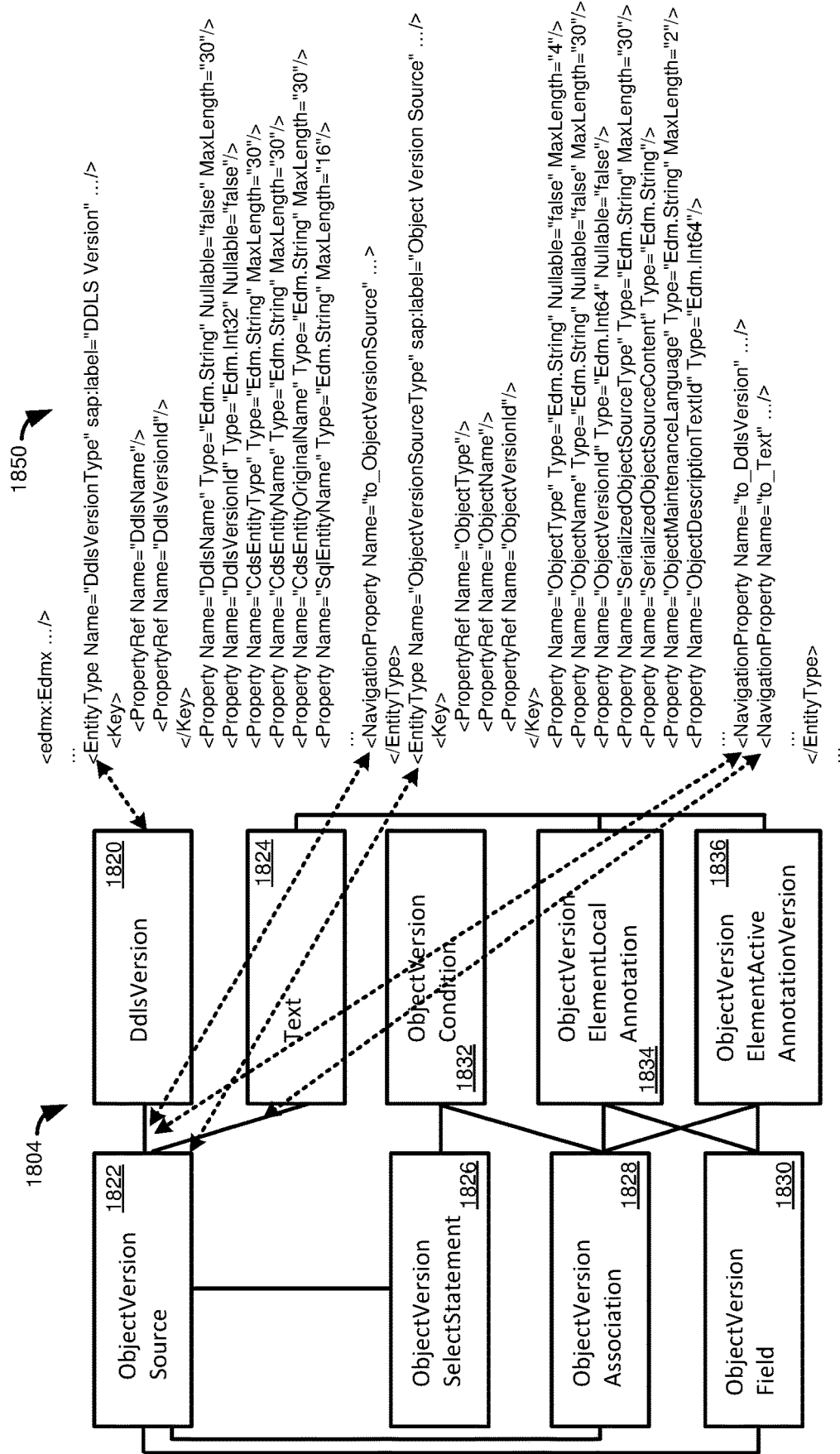
FIG. 18 illustrates code for a data access service that can access a persistency model for metadata models.

FIG. 18 illustrates an extract 1804 of a persistency model (e.g., all or a portion of the tables of Examples 11-14) and an extract 1850 of an OData service that can be used to access data maintained in the persistency, or determined or calculated from data in the persistency. The persistency extract 1804 can include tables, or portions thereof (e.g., one or more fields), for DDLS version information 1820, object version source information 1822, textual information 1824 (e.g., text of original metadata object definition information), select statement information 1826 associated with object versions, association information 1828 associated with object versions, field information 1830 associated with object versions, condition information 1832 associated with object versions (e.g., "where" or "on" conditions, such as described with respect to table 1232), local annotation information 1834 associated with object versions, and active annotation information 1836 associated with object versions.

An API, or other functionality for accessing services of a metadata service, can provide functionality for, among other things, querying and maintaining representations of metadata models, such as to create, update, or delete metadata model representations (or specific versions thereof). The API can allow for other options, such as aggregating data from persisted metadata model representations or searching a metadata repository, including using fuzzy search techniques. For example, a user (or an application) might request information regarding how many objects are registered in a repository, how many versions are associated with a particular object, or a number of fields, such as a maximum number of fields, that an object may have.

FIG. 19 illustrates an example table 1904 having objection version source information, and an example table 1908 having DDLS version information. The table 1904 can have multiple fields, including a field 1912 for an object type associated with a record, a field 1914 for an object name associated with a record, and a field 1916 for an object version identifier associated with a record. The table 1908 can have a field 1920 for a DDLS name, a DDLS version field 1922, an entity name (such as a CDS entity name) field 1924, and an original entity name field (such as an original CDS entity name) field 1926.

Taking the metadata representations of tables 1904 and 1908 and using the extract 1850, a navigation property of the extract can be traversed to the DDLS version table 1908 from a record of the object version source table 1904 by an OData read request like:

. . . /sap/opu/odata/sap/CdsMetadataService/ObjectVersionSource(ObjectType='DDLS',ObjectName='I_SALESORDER',ObjectVersionId=1)/to_DdlsVersion The operation results in the related data record:
<?xml version="1.0" encoding="UTF-8"?>
<id> . . . /sap/opu/odata/sap/CdsMetadataService/DdlsVersion(DdlsName='I_SALESORDER', DdlsVersionId=1)</id> . . .
<content type="application/xml">
  <m:properties>
    <d:DdlsName>I_SALES ORDER</d:DdlsName>
    <d:DdlsVersionId>1</d:DdlsVersionId>
  </m:properties>
</content> . . .

The API can allow all related information for a given object version to be searched. For example, a search request for "cust" can have the form:

. . . /sap/opu/odata/sap/CdsMetadataService/Ddls/?search=cust

Which retrieves all five records having the DDLS object name (e.g., field 1914) as I_CUSTOMER. Note that a user can retrieve and access metadata information without knowing the exact name of a metadata model or any of its constituent elements.

An API, or other metadata service access functionality, can support other services, including services based on more coarse granular actions than just simply retrieving and updating metadata models. These services can include uploading object source information, comparing metadata models (and parts thereof), including comparing metadata models between different components or system versions. Analysis can be provided of where various metadata models, or elements, are used, including identifying dependencies between metadata models/metadata model components. Providing such services can be more efficient, and less error prone, than achieving the functionality every time through the application of multiple lower level functions.

As an example, for a request to upload a metadata model, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:
ObjectType
ObjectName
SerializedObjectSourceType
SerializedObjectSourceContent
ObjectMaintenanceLanguage
ObjectLastChangedDateTime
SoftwareComponentId
SoftwareComponentReleaseId A metadata repository can be queried to determine whether a new version of the metadata model needs to be created, and, if so, can convert the uploaded model to a persistency format used by the metadata service. In at least some cases, it can be determined whether any metadata models depend on the updated model and, if so, such dependent models can be updated to provide new model versions.

For a function that compares two metadata models, including two versions of a metadata model, information can be provided as to differences between the objects, how metadata models differ between different versions of a software component, or how metadata models differ between two versions of a system. Example input for comparing two versions of a metadata model can include:
ObjectType
ObjectName
ObjectVersion1Id
ObjectVersion2Id
ChangeTypes [e.g., change types to be queries, such as all, insert, update, delete, unchanged]
ComparisionScope [e.g., all elements of a metadata model, or only specified elements or sets of elements]
The comparison can return information including:
ObjectVersion
ChangeType
SubObjectType [e.g., field, association, parameter]
SubObjectName
PropertyType [e.g., active annotation, key, data type, name]
PropertyName
PropertyValue The following can represent information in a request for changes in a metadata model:
Input:
ChangeTypes=INSERT
ComparisonScope=ALL
The response can include:
Output:
ObjectVersion=2
ChangeType=INSERT
SubObjectType=FIELD
SubObjectName=NewField
Thus, the comparison request reveals that a new field, NewField, was introduced in object version 2 of the metadata model.

A metadata exposure service or other functionality for accessing a metadata respository can be to return a list of objects where a particular metadata element is used. For example, a field may be initially defined for a particular table, but then may be referenced by multiple views. Input for this functionality can include:
Input:
ObjectType: Identification
ObjectName: Identification
ObjectVersionId: Identification
UseageTypes [e.g., ALL, association, target, data source, annotation)
MaximumNumberOfIndirections
The output of the request can include:
UsingObjectType
UsingObjectName
UsingObjectVersionId
UsageType
DirectlyUsedObjectType
DirectlyUsedObjectName
DirectlyUsedObjectName
DirectlyUsedObjectVersionId
NumberOfIndirections FIG. 20 provides an example of a "where used" request. A group 2004 of related metadata models includes a metadata model 2008 for a View3 that references a metadata model 2010 for a View2, which references a metadata model 2012 for a View1, which in turn references a metadata model 2014 for a Table1. Assuming that each of the views, 2008, 2010, 2012 references a field of Table1, and that the views refer to this field through their referenced views as shown, a request could be:
Input:

ObjectName: TABLE1
UseageTypes: ALL
MaximumNumberOfIndirections: 5
In response to the request, the information shown in table 2030 could be provided, either in tabular form as shown, or in another format.

For a dependency check, input (e.g., arguments to the function) can include:
ObjectType
ObjectName
ObjectSourceType
ObjectSourceContent
SoftwareComponentVersions
NewSoftwareComponentVersions
A response to the request (e.g., values returned by the function, such as in a structure (e.g., a C++ struct) or class instance, or another complex or abstract data type), can include:
MessageType [e.g., INFO, WARNING, ERROR]
MessageText
EntityReference [e.g., a link to additional details for the metadata model, so that additional information regarding dependent objects can be identified]

As a particular example, consider that a new annotation, NewAnnotation, is added to a field ViewField, which is exposed by a user model. Output for a dependency check can include:
MessageType: INFO
MessageText: A new annotation NewAnnotation was added to the field ViewField
EntityReference= . . . /sap/opu/odata/sap/CdsMetadataService/ . . . NewAnnotation . . .

A service processing access to metadata can cause, or assist, in displaying metadata information to an end user, such on a user interface screen. The service can augment model metadata with additional information that can define the layout of the user interface, and can include or define additional services that allow a user to interact with the data. For example, annotations can be provided that assist a user in providing filter criteria via a value help, as shown in the example code of FIG. 21.

Example 16

Example Implementations

FIG. 22A is a flowchart of an example method 2200 that can be carried out by a computing system that implements a central metadata repository. In particular implementations, the operations can be carried out in the computing environment 100 of FIG. 1. At 2210, a request for metadata that includes a relevancy identifier is received. The relevancy identifier can identify a particular client, schema, product, or other information for determining a subset of metadata that should be sent to the client. In the case of a client identifier, the client identifier can be associated with a relevancy profile in the repository (for example, a list or table or database artefacts, components thereof, metadata objects or artefacts, or components thereof, or combinations thereof). In some cases, multiple clients have or use the same relevancy identifier or profile, or a given client can be associated with multiple relevancy identifiers or profiles.

A set of metadata objects is reviewed at 2220 to determine of a subset of the metadata objects or components that is relevant to the request. In some cases, the set is all of the metadata in the repository matching the relevancy identifier, while in other cases the set is constrained by other criteria, such as the identity of the client. For example, the identity of the client can determine whether the client is authorized to access particular metadata. Metadata for the subset is returned to the client in response to the request at 2230.

FIG. 22B is a flowchart of an example method 2250 where multiple clients access metadata in a central metadata repository, such as in the computing environment 100 of FIG. 1. At 2260, a request is received from a first client system for metadata, where the first request includes a first relevance identifier. Using the first relevance identifier, a set of metadata objects is reviewed to determine a first subset of the set at 2265. The operations 2260, 2265 can be implemented as described in conjunction with FIG. 22A. Metadata for the first subset is returned to the first client at 2270 in response to the first request.

At 2280, a second request from a second client system is received that includes a second relevancy identifier. The set of metadata objects is reviewed at 2285 to determine a second subset of the set using the second relevancy identifier. Operations 2280, 2285 can be implemented in an analogous manner as operations 2210, 2220. At 2290, metadata for the second subset is returned to the second client in response to the second request.

Example 17

Computing Systems

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing components of the environment 100 of FIG. 1, including as described in Examples 1-16. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18

Cloud Computing Environment

Figure 24:
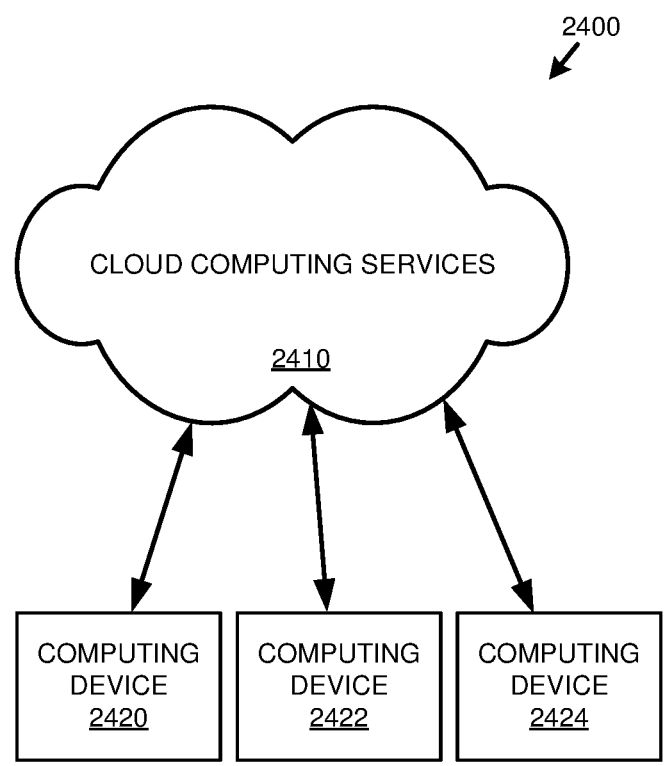
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 19

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer readable storage media store computer-executable instructions that, when executed, cause the computing system to perform operations comprising:
      storing in a repository a plurality of metadata objects, at least a first portion of the plurality of metadata objects comprising a respective relevance identifier, wherein at least a first metadata object of the at least a first portion of the plurality of metadata objects comprises a first relevance identifier value that is different from a second relevance identifier value of at least a second metadata object of the at least a first portion of the plurality of metadata objects, wherein metadata objects of the plurality of metadata objects comprise respective definitions, where a respective definition comprises a plurality of metadata elements and is useable to create an instance of a metadata object having the respective definition;
      receiving a request for metadata elements of at least a second portion of the at least a first portion of the plurality of metadata objects comprising the first relevance identifier value, the request comprising the first relevance identifier value and not comprising the second relevance identifier value;
      using the first relevance identifier value, reviewing a set comprising the at least a first portion of the plurality of metadata objects to determine a subset of the set, wherein metadata objects of the at least a first portion of the plurality of metadata objects are included in the subset when a definition of a given metadata object of the at least a first portion of the plurality of metadata objects comprises the first relevance identifier value and the subset comprises multiple metadata objects of the at least a first portion of the plurality of metadata objects; and
      returning at least a portion of metadata elements in the definitions of the given metadata objects in the subset in response to the request.

2. The computing system of claim 1, wherein the relevance identifier is not identical to an identifier for a client sending the request.

3. The computing system of claim 1, wherein the request is a first request, the relevance identifier is a first relevance identifier, and the subset is a first subset, the operations further comprising:
   receiving a second request for metadata, the second request comprising a second relevance identifier different than the first relevance identifier; and
   using the second relevance identifier, reviewing the set comprising the plurality of metadata objects to determine a second subset of the set of the plurality of metadata objects, where the first subset and the second subset are not equal.

4. The computing system of claim 1, wherein the reviewing comprising applying one or more scoping functions to determine one or more database artefacts that are associated with a first database artefact.

5. The computing system of claim 4, wherein an identifier of the first database artefact is provided in the request.

6. The computing system of claim 4, wherein an identifier of the first database artefact is determined from an identifier of a client from whom the request originated.

7. The computing system of claim 1, wherein metadata objects of the subset comprise the relevance identifier.

8. The computing system of claim 7, wherein the relevance identifier comprises an identifier of a client from whom the request originated.

9. The computing system of claim 1, wherein the relevance identifier identifies a particular software application, subject area, or computer-implemented process.

10. The computing system of claim 1, wherein the subset is a first subset and is selected from a second subset, the first subset being a subset of the second subset, the second subset comprising related database artefacts.

11. The computing system of claim 10, wherein the related database artefacts are related by a foreign key or an association.

12. The computing system of claim 1, wherein metadata objects are defined for respective database artefacts and the relevance identifier is included as an annotation to a definition of a metadata object for the respective database artefact.

13. The computing system of claim 1, wherein metadata objects are defined for respective database artefacts and the relevance identifier is included as an element in a definition of a metadata object for the respective database artefact.

14. The computing system of claim 1, where the relevance identifier is associated with a database artefact.

15. The computing system of claim 14, wherein the database artefact is a table or a view.

16. The computing system of claim 14, wherein the relevance identifier is associated with a subcomponent of a table or a view.

17. The computing system of claim 1, wherein the set or the subset is determined at least in part based on authorization information associated with a client from whom the request originated.

18. The computing system of claim 1, wherein the plurality of metadata objects are maintained in a central repository and requests for metadata from the central repository are received from a plurality of client systems, where different client systems may specify different subsets of relevant metadata using relevance identifiers.

19. One or more non-transitory computer-readable storage media comprising:
   computer-executable instructions that, when executed by a computing system comprising at least one hardware processor and at least one memory coupled to the at least one hardware processor, cause the computing system to receive a first request from a first client system for at least a portion of metadata elements included in one or more metadata object definitions associated with a first relevance identifier, wherein a respective metadata object definition is useable to create an instance of a metadata object having the respective metadata object definition, the first request comprising the first relevance identifier;
   computer-executable instructions that, when executed by the computing system, cause the computing system to, using the first relevance identifier, review a set comprising a plurality of metadata objects to determine a first subset of the set, the first subset of the set comprising at least a portion of the plurality of metadata objects associated with the first relevance identifier;
   computer-executable instructions that, when executed by the computing system, cause the computing system to return metadata elements for the metadata objects of the first subset in response to the first request;
   computer-executable instructions that, when executed by the computing system, cause the computing system to receive a second request from a second client system, different than the first client system, for metadata, the second request comprising a second relevance identifier, different than the first relevance identifier;
   computer-executable instructions that, when executed by the computing system, cause the computing system to, using the second relevance identifier, review the set of the plurality of metadata objects to determine a second subset of the set of the plurality of metadata objects, the first subset not being equal to the second subset; and
   computer-executable instructions that, when executed by the computing system, cause the computing system to return metadata elements for metadata objects of the second subset in response to the second request.

20. A method, implemented in a computing environment comprising a computing system hosting a central metadata repository accessible to a plurality of different client systems, the computing system comprising at least one hardware processor and at least one memory coupled to the at least one hardware processor, the method comprising:
   storing in a repository a plurality of metadata objects, at least a first portion of the plurality of metadata objects comprising a respective relevance identifier, wherein at least a first metadata object of the at least a first portion of the plurality of metadata objects comprises a first relevance identifier value that is different from a second relevance identifier value of at least a second metadata object of the at least a first portion of the plurality of metadata objects, wherein metadata objects of the plurality of metadata objects comprise respective definitions, where a respective definition comprises a plurality of metadata elements and is useable to create an instance of a metadata object having the respective definition;
   receiving a request for metadata elements of at least a second portion of the at least a first portion of the plurality of metadata objects comprising the first relevance identifier value, the request comprising the first relevance identifier value and not comprising the second relevance identifier value;
   using the first relevance identifier value, reviewing a set comprising the at least a first portion of the plurality of metadata objects to determine a subset of the set, wherein metadata objects of the at least a first portion of the plurality of metadata objects are included in the subset when a definition of a given metadata object of the at least a first portion of the plurality of metadata objects comprises the first relevance identifier value and the subset comprises multiple metadata objects of the at least a first portion of the plurality of metadata objects; and
   returning at least a portion of metadata elements in the definitions of the given metadata objects in the subset in response to the request.

* * * * *